United States Patent
Miyamoto

(10) Patent No.: US 7,050,184 B1
(45) Date of Patent: May 23, 2006

(54) DATA TRANSFER APPARATUS AND METHOD, AND DATA TRANSFER SYSTEM AND MEDIUM

(75) Inventor: Ryosuke Miyamoto, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/299,875

(22) Filed: Apr. 27, 1999

(30) Foreign Application Priority Data

Apr. 30, 1998 (JP) .................................. 10-121063

(51) Int. Cl.
G06F 15/00 (2006.01)
(52) U.S. Cl. ................. 358/1.15; 358/1.13; 358/468
(58) Field of Classification Search ............ 358/1.1, 358/1.12, 1.13, 1.14, 1.15, 405, 407, 468, 358/442

See application file for complete search history.

(56) References Cited

U.S. PATENT DOCUMENTS 5,650,862 A    7/1997 Shimizu et al. ............. 358/448
6,249,835 B1 * 6/2001 Isoda ........................ 710/201

* cited by examiner

*Primary Examiner*—Mark Wallerson
(74) *Attorney, Agent, or Firm*—Fitzpatrick, Cella, Harper & Scinto

(57) ABSTRACT

In a conventional system to which a plurality of devices are connected by a serial bus, the throughput of the network decreases due to transfer of a large amount of data. In this invention, a controller connected to the devices via a 1394 serial bus calculates a band width necessary for data transfer in a specific one of the devices, ensures the first channel corresponding to the band width, and transfers data to the specific device using the first channel. This enables preferential data transfer to the specific device to avoid a decrease in throughput.

45 Claims, 30 Drawing Sheets

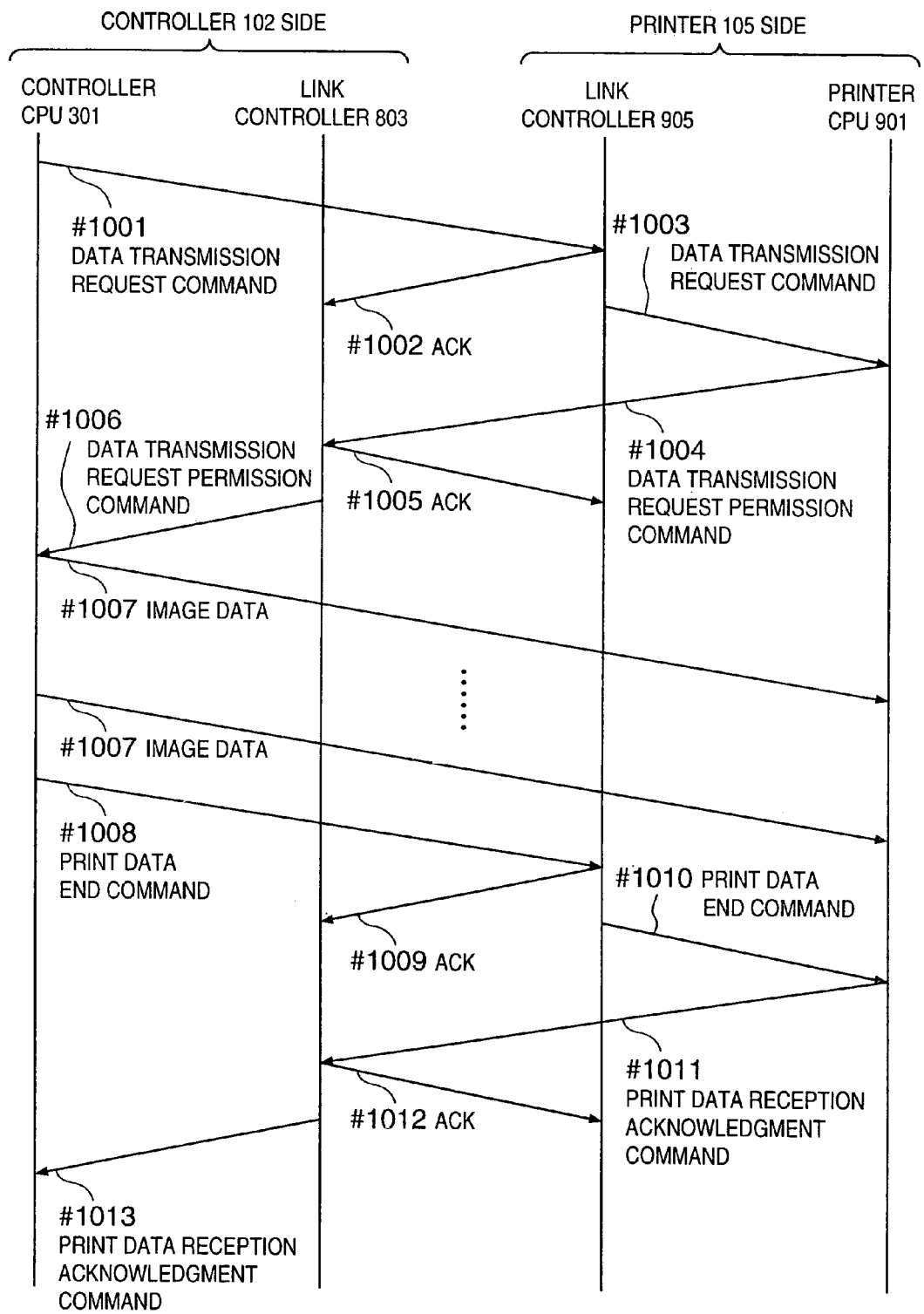

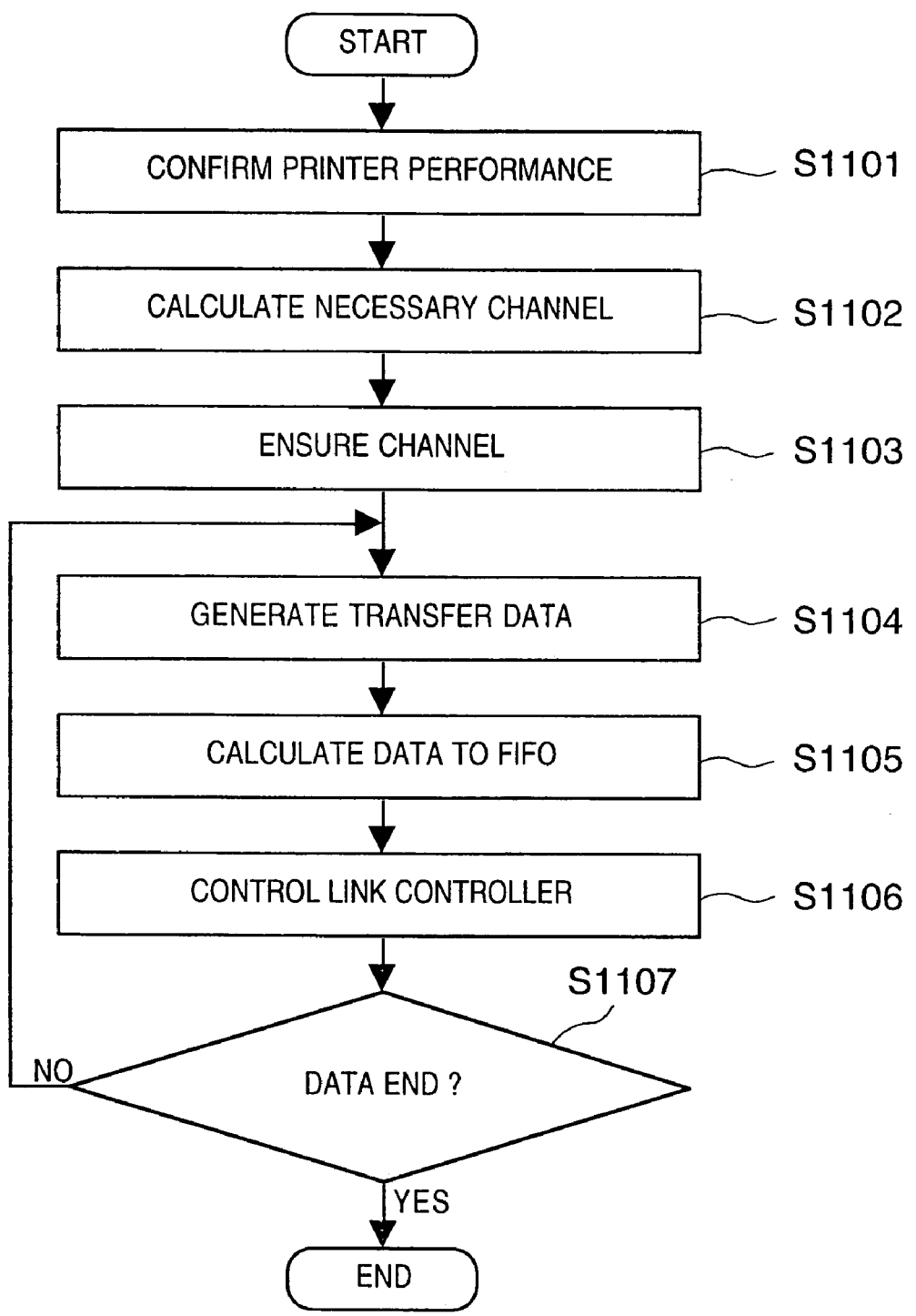

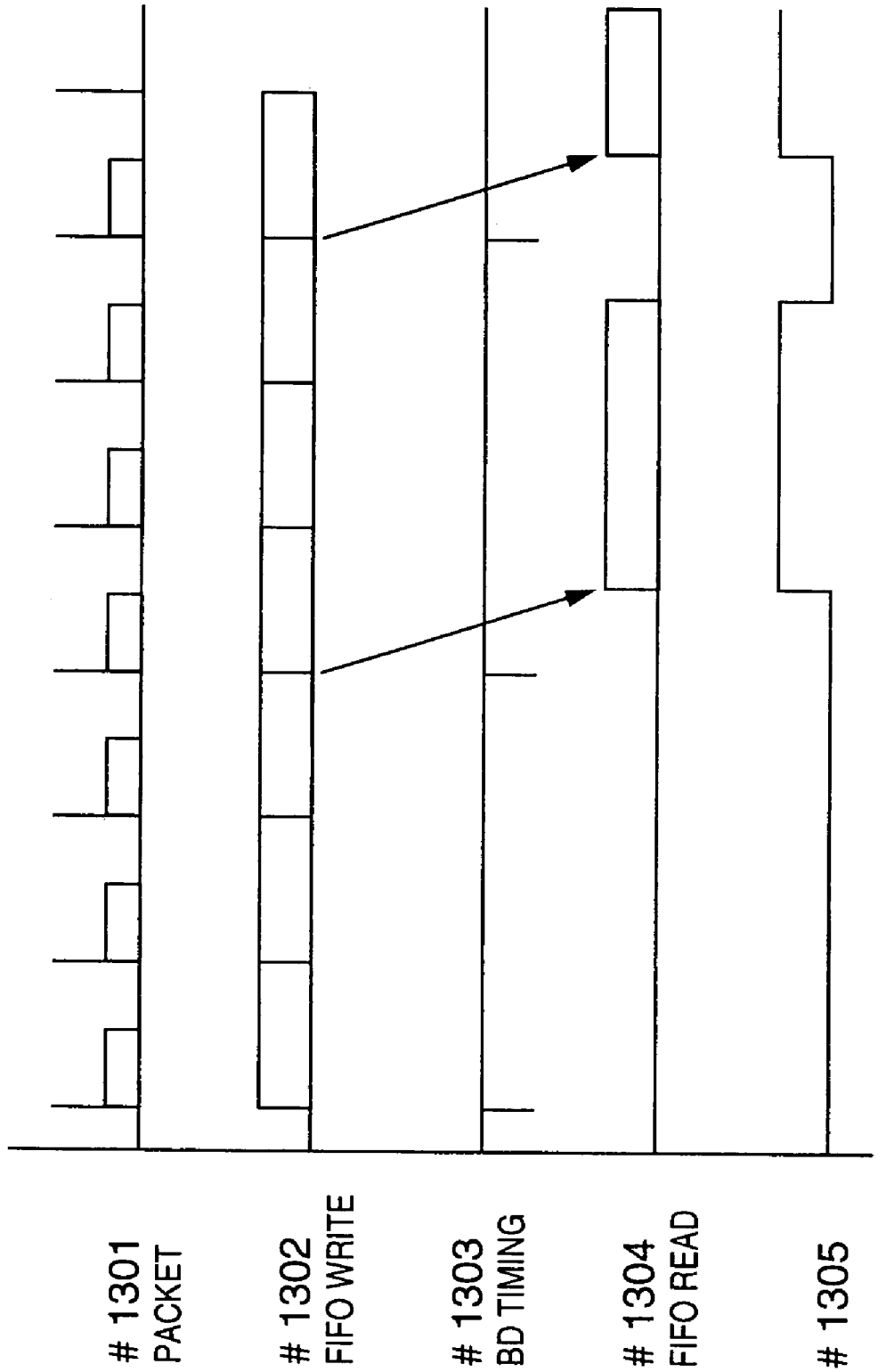

CLOCK : EXCLUSIVE-OR SIGNAL BETWEEN DATA AND STROBE

BRANCH : NODE WITH TWO OR MORE NODE CONNECTIONS

LEAF : NODE WITH SINGLE PORT CONNECTION

▫ : PORT
c : PORT CORRESPONDING TO CHILD NODE
p : PORT CORRESPONDING TO PARENT NODE

FIG. 27

| data_length | TAG | CHANNEL NO. | tcode | sy |
| | header_CRC | | | |
| | data_field (4×N BITE) | | | |
| | data_CRC | | | |

FIG. 29

| ITEM | CONTENT |
|---|---|
| NODE NUMBER | NODE NO. 0 / 1 / 2 / ... |
| TRANSFER RATE | 100 / 200 / 400Mbps |
| DEVICE TYPE | SCANNER / PRINTER / COPIER |
| IMAGE DATA INPUT / OUTPUT | INPUT / OUTPUT / INPUT & OUTPUT |
| SCANNER DATA TYPE | COLOR / MONOCHROME |
| SCANNER RESOLUTION | dpi |
| SCANNER BIT DEPTH | bit / pixel |
| PRINTER DATA TYPE | COLOR / MONOCHROME |
| PRINT SPEED | ppm |
| PRINTER RESOLUTION | dpi |
| PRINTER BIT DEPTH | bit / pixel |

FIG. 30

| ITEM | 103 | 104 | 105 | 106 |
|---|---|---|---|---|
| NODE NUMBER | NODE NO. 1 | NODE NO. 2 | NODE NO. 3 | NODE NO. 4 |
| TRANSFER RATE | 200 Mbps | 200 Mbps | 100 Mbps | 200 Mbps |
| DEVICE NAME | COPIER | PRINTER | PRINTER | COPIER |
| IMAGE DATA INPUT / OUTPUT | INPUT & OUTPUT | INPUT | INPUT | INPUT & OUTPUT |
| SCANNER DATA TYPE | COLOR (RGB) | — | — | MONO-CHROME |
| SCANNER RESOLUTION | 400dpi | — | — | 600dpi |
| SCANNER BIT DEPTH | 8bit / pixel | — | — | 8bit / pixel |
| PRINTER DATA TYPE | COLOR (CMYK) | MONO-CHROME | MONO-CHROME | MONO-CHROME |
| PRINT SPEED | 6ppm | 33ppm | 24ppm | 6ppm |
| PRINTER RESOLUTION | 400dpi | 600dpi | 400dpi | 600dpi |
| PRINTER BIT DEPTH | 8bit / pixel | 1bit / pixel | 1bit / pixel | 8bit / pixel |

DATA TRANSFER APPARATUS AND METHOD, AND DATA TRANSFER SYSTEM AND MEDIUM

BACKGROUND OF THE INVENTION

1. Field of the Invention

This invention relates to a data transfer apparatus and method and a data transfer system and medium and, more particularly, to a data transfer apparatus and method in a system in which a plurality of devices are connected by a serial bus, and a data transfer system and medium.

2. Description of the Related Art

Multifunctional image processing devices have remarkably been developed along with recent digital copying machines and copying machine systems. Composite functions are being advanced such that the copying machine is integrated with a facsimile function and connected to a network to add a printer function.

FIG. 2 shows an example of the configuration of an office network including a conventional digital copying machine. In FIG. 2, reference numeral 200 denotes a network such as an Ethernet to which network devices such as an office personal computer, printer and digital copying machine are connected; 201, a personal computer (to be referred to as a PC hereinafter) serving as a server connected to the scanner of a digital copying machine 202; 202, a digital copying machine; 203, a controller for connecting the digital copying machine to the network; 204, a color copying machine; 205, a controller for connecting the color copying machine 204 to the network; 206 and 207, network printers; and 208, 209, 210, 211, 212 and 213, PC clients connected to the network 200.

To perform printout on the PC client side in this network environment, printout data is sent after the client selects the network printer 206 or 207, the digital copying machine 202 via the controller 203, or the color copying machine 204 via the controller 205. If the processing speed of the digital copying machine 202 is insufficient for obtaining a large number of copies by the digital copying machine, printout data can be output to the network printers 206 and 207 via the network 200.

In the conventional network system, however, a large amount of data flows through the network in addition to printout data. Particularly when a large amount of image data or the like flows, the throughput of the whole network greatly decreases.

Even if a job of a specific user or printer is to be preferentially done, this control is difficult to perform on a network involving in many communications, resulting in low job throughput for the preferential device.

SUMMARY OF THE INVENTION

Accordingly, it is an object of the present invention to provide a data transfer apparatus and method for avoiding a decrease in network throughput caused by transfer of a large amount of data, and a data transfer system and medium.

According to the present invention, the foregoing object is attained by providing a data transfer apparatus for transferring data to a plurality of devices connected by a serial bus, comprising band width calculation means for calculating a band width necessary for data transfer in a specific device out of the plurality of devices; first channel ensuring means for ensuring a first channel corresponding to the band width; and first transfer means for performing data transfer about the specific device using the first channel.

This apparatus can avoid a decrease in network throughput by transfer of a large amount of data.

And it is another object of the present invention to provide a data transfer apparatus and method capable of executing preferential job processing for a specific device in the network, and a data transfer system and medium.

According to the present invention, the foregoing object is attained by providing a data transfer apparatus further comprising monitoring means for monitoring a usage of the specific device by the first channel, and the first channel ensuring means ensures the first channel again in accordance with the usage of the specific device.

This apparatus enables preferential job processing for a specific device in the network.

The invention is particularly advantageous since an isochronous channel for a specific device in a network using a 1394 serial bus can be ensured and maintained in the network to preferentially process a job related to this device. That is, the device can be permitted to preferentially use the network.

Hence, the network can be efficiently used to provide a data transfer apparatus and method for avoiding a decrease in network throughput caused by transfer of a large amount of data, and a data transfer system and medium.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a chart showing transition of transfer of commands and image data between the controller and printer;

FIG. 9 is a flowchart showing image data transfer processing in the controller;

FIG. 11 is a timing chart showing a transfer data print operation;

FIG. 27 is a diagram showing an example of a packet format for the isochronous transfer;

FIG. 29 is a table showing the format of a node attribute table generated in the controller;

FIG. 30 is a table showing an example of the node attribute table; and

DETAILED DESCRIPTION OF THE PREFERRED EMBODIMENTS

Preferred embodiments of the present invention will now be described in detail in accordance with the accompanying drawings.

First Embodiment

The first embodiment employs an interface defined by the IEEE 1394 standard (to be referred to as a "1394 serial bus") as a digital I/F for connecting respective devices. The 1394 serial bus will be generally described in advance.

[Outline of 1394 Serial Bus]

With the appearance of general digital video cam recorder (VCR) and digital video disk (DVD) player, there is a need for transferring realtime and large amount data such as video data and audio data (hereinafter referred to as "AV data"). To transfer AV data in realtime to a personal computer (PC) or other digital devices, an interface capable of high-speed data transfer is required. The 1394 serial bus has been developed from the above purpose.

Figure 13:
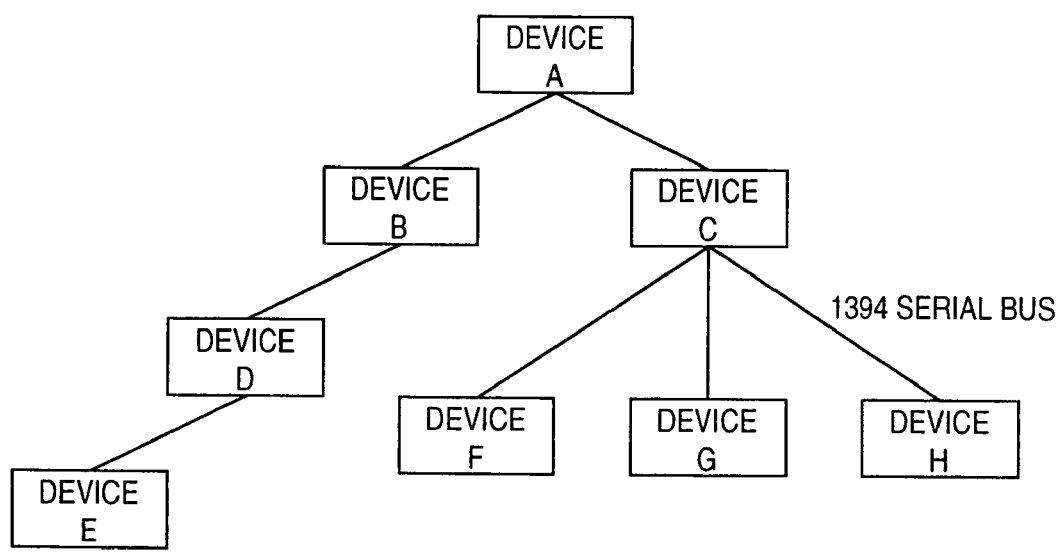
FIG. 13 is a block diagram showing an example of a network system constructed with an IEEE 1394 serial interface.

FIG. 13 shows an example of a network system constructed with a 1394 serial bus. This system comprises devices A to H, and the devices A and B, the devices A and C, the devices B and D, the devices D and E, the devices C and F, the devices C and G, and the device C and H are respectively connected by a twisted pair cable for the 1394 serial bus. These devices A to H may be computers such as a personal computer, or most computer-peripheral devices such as a digital VCR, a DVD player, a digital still camera, a storage device using a storage medium such as a hard disk or an optical disk, a monitor such as a CRT or an LCD, a tuner, an image scanner, a film scanner, a printer, a MODEM, and a terminal adapter (TA), a Set-Top-Box, a digital television, a conference camera, a digital video system and a complex machine of them.

Note that the printing method of the printer may be any method, e.g., a laser-beam printing, an electrophotographic method using an LED, an ink-jet method, a thermal-transfer method of ink melting or ink sublimation type and a thermo-sensitive printing method.

The connection between the devices may be made by intermixing a daisy chain method and a node branching method, thus realizing high-freedom of connecting.

The respective devices have an ID, and they construct a network by identifying each ID within a range connected by the 1394 serial bus. For example, the devices, respectively, take a relaying role when connected in a daisy-chain with cables for the 1394 serial bus, thus constructing a network.

As the 1394 serial bus corresponds to Plug and Play function, it automatically recognizes a device connected to the cable, thus recognizes connection status. In the system as shown in FIG. 13, when a device is removed from the network, or a new device is added to the network, the bus is automatically reset (i.e., the current network constructing information is reset), and a new network is constructed. This function enables realtime setting and recognition of network construction.

The 1394 serial bus has a data transfer speed defined as 100/200/400 Mbps. A device having a high transfer speed supports a lower transfer speed, thus maintaining compatibility. As data transfer modes, an asynchronous transfer mode (ATM) for transferring asynchronous data such as control signals, an isochronous transfer mode for transferring isochronous data such as realtime AV data are available. In data transfer, within each cycle (generally 125 ms/cycle), a cycle start packet (CSP) indicating the start of cycle is transferred, and then asynchronous and isochronous data are mixedly transferred such that the isochronous data transfer is transferred prior to the asynchronous data.

Figure 14:
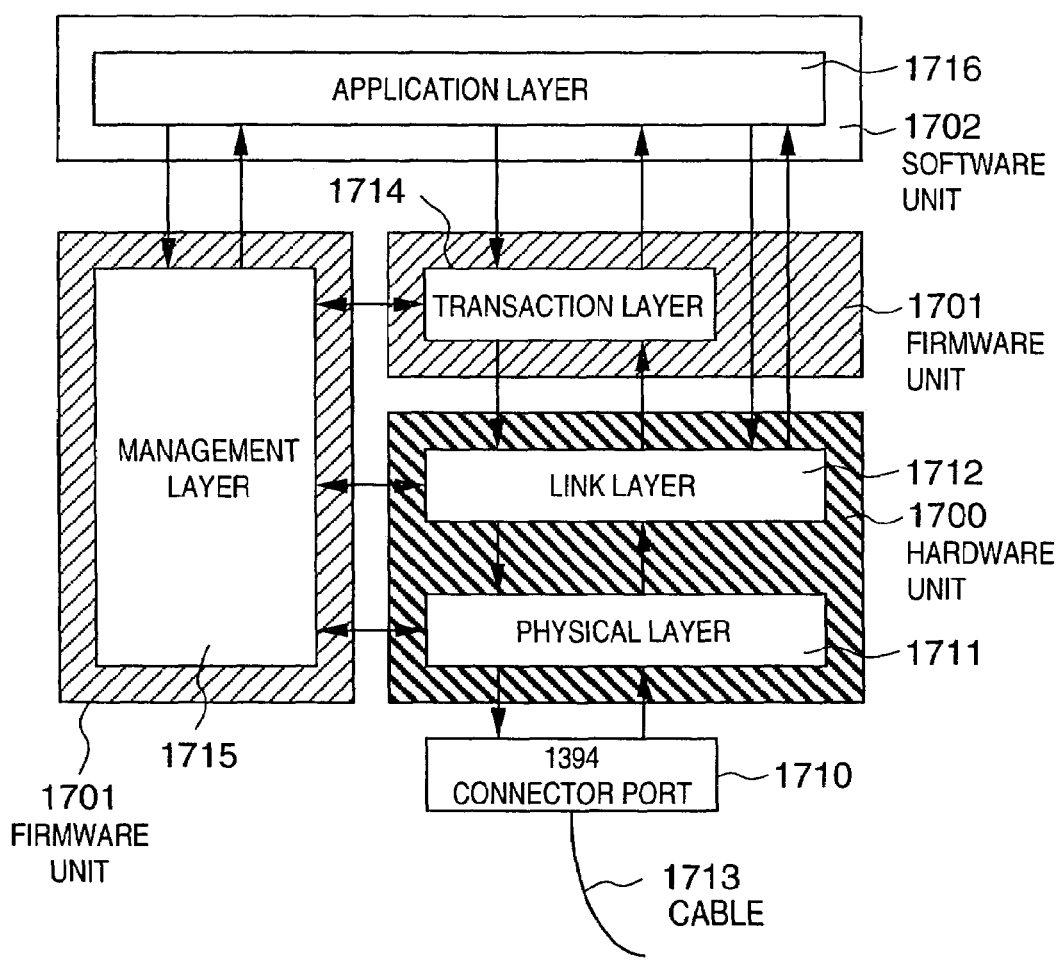
FIG. 14 is a block diagram showing the construction of the IEEE 1394 serial interface.

FIG. 14 shows the construction of the 1394 serial bus, as a layer structure. As shown in FIG. 14, a connector port 1710 is connected to a connector at the end of a cable 1713 for the 1394 serial bus. A physical layer 1711 and a link layer 1712 in a hardware unit 1700 are positioned as upper layers with respect to the connector port 1710. The hardware unit 1700 comprises interface chips. The physical layer 1711 performs coding, connection-related control and the like, and the link layer 1712, packet transfer, cycle-time control and the like.

In a firmware unit 1701, a transaction layer 1714 manages data to be transferred (transaction data), and outputs commands Read, Write and Lock. A management layer 1715 in the firmware unit 1701 manages connection statuses and ID's of the respective devices connected to the 1394 serial bus, thus manages the network construction. The above hardware and firmware units substantially construct the 1394 serial bus.

In a software unit 1702, an application layer 1716, differs in software used by the system, and the data transfer protocol indicating how to transfer data on the interface is defined by a protocol such as a printer protocol or an AV/C protocol.

Figure 15:
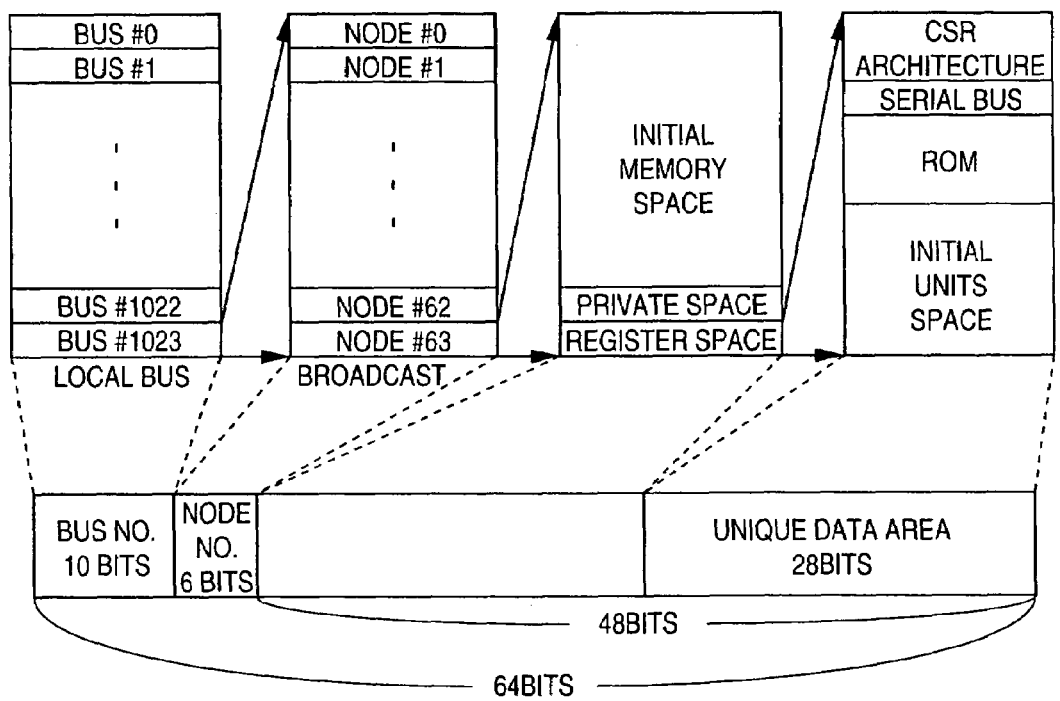
FIG. 15 is an explanatory view showing address space of the IEEE 1394 serial interface.

FIG. 15 shows address space of the 1394-serial bus. All the devices (nodes) connected to the 1394 serial bus have a unique 64 bit address. The 64 bit address is stored in a memory of the devices. Data communication with a designated destination device can be performed by always recognizing the node addresses of the transmitting- and receiving-side nodes.

Addressing of the 1394 serial bus is made based on the IEEE 1212 standards, such that first 10 bits are allocated for designating a bus number, then next 6 bits are allocated for designating an node ID. The remaining 48 bits are the address width allocated to the device, and can be used as unique address space. For instance, the last 28 bits may be used as a unique data area for storing a device identification data or usage-condition designation data.

The 1394 serial bus has the construction as described above. Next, the features of the 1394 serial bus will be described in more detail.

[Detail Description of 1394 Serial Bus]

<<Electrical Specification of 1394 Serial Bus>>

Figure 16:
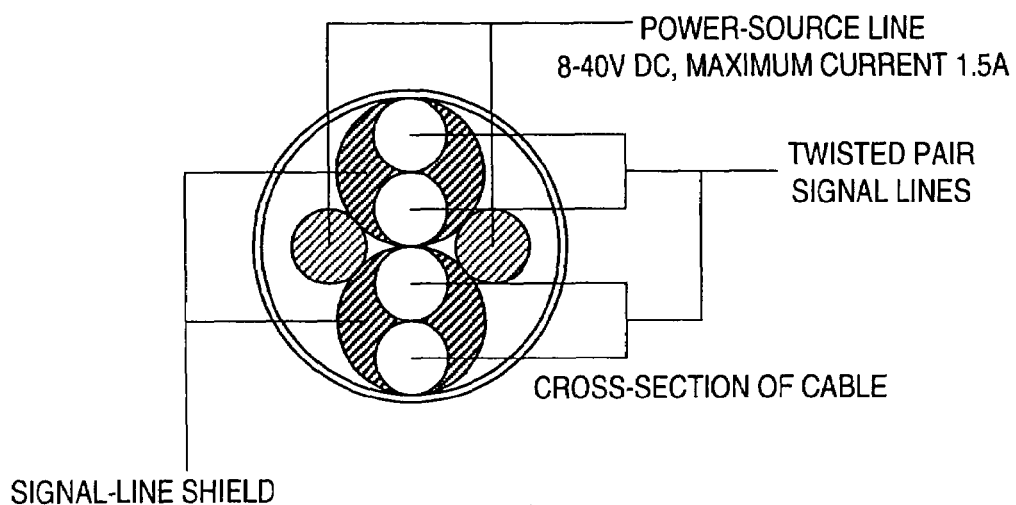
FIG. 16 is a cross-sectional view showing a cable for the IEEE 1394 serial interface.

FIG. 16 shows a cross-section of the cable of the 1394 serial bus. The 1394 serial cable comprises two sets of twisted pair signal lines and two power-source lines. This construction enables power supply to a device which lacks a power source, or a device where a voltage is degraded due to a failure or the like. The direct-current voltage supplied by the power-source lines is 8 to 40V; the current is maximum 1.5 A. Note that in the standards for so-called DV cable, four lines except the power-source line construct the cable.

<<DS-Link>>

Figure 17:
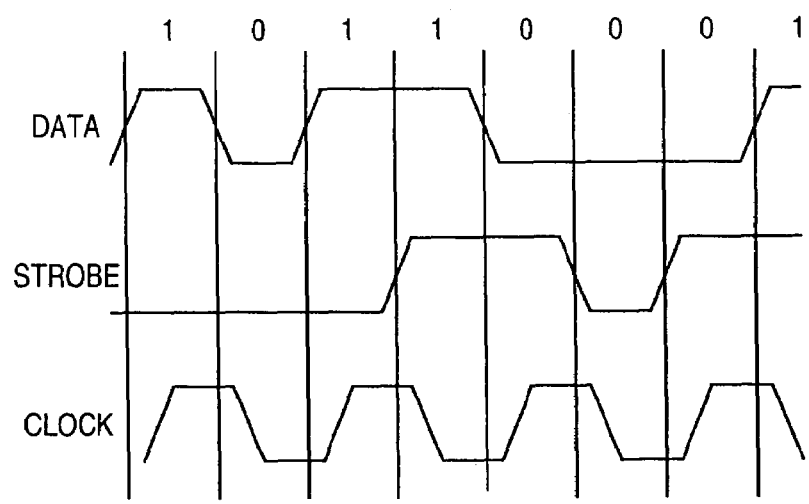
FIG. 17 is a timing chart explaining a Data/Strobe Link method.

FIG. 17 is a timing chart explaining a DS-Link (Data/Strobe-Link) method as a data transfer method.

The DS-Link method, appropriate for high-speed serial data communication, requires two sets of two signal lines. That is, one of the two sets of twisted-pair signal lines is used for sending a data signal, and the other one set of twisted-pair signal lines is used for sending a strobe signal. On the receiving side, an EXCLUSIVE-OR between the data signal and the strobe signal is obtained so as to generate a clock signal. In the DS-Link transfer, it is unnecessary to mix a clock signal into a data signal, therefore, transfer efficiency is higher than that in other serial-data transfer methods. Further, as a clock signal is generated from the data signal and the strobe signal, a phase locked loop (PLL) circuit can be omitted, which attains downsizing of the scale of a controller LSI. Further, in the DS-Link transfer, it is unnecessary to send information indicative of idle status when there is no data to be transferred, therefore, a transceiver of each device can be set in a sleep status, which reduces electric consumption.

<<Bus-Reset Sequence>>

The respective devices (nodes) connected to the 1394 serial bus are provided with a node ID, and are recognized as nodes constructing the network. For example, when increase/decrease of the number of nodes due to connection/disconnection or power ON/OFF status of network devices, i.e., network construction changes and it is necessary to recognize a new network construction, the respective nodes detect the change of network construction, send a bus-reset signal onto the bus, and enter a mode for recognizing the new network construction. The detection of change of network construction is made by detecting change of bias voltage at the connector port 810.

When the bus-reset signal is sent from one node, the physical layer 811 of the respective nodes receives the bus-reset signal, and at the same time, notifies the link layer 812 of the occurrence of bus reset, and forwards the bus-reset signal to the other nodes. When all the nodes have received the bus-reset signal, a bus-reset sequence is started.

Note that the bus-reset sequence is started when the cable is attached/detached, or the hardware unit 800 has detected network abnormality or the like. Further, the bus-reset sequence is also started by a direct instruction to the physical layer 811 such as host control by a protocol. As the bus-reset sequence is started, data transfer is suspended during the bus reset, and after the bus reset, the data transfer is restarted in the new network construction.

<<Node-ID Determination Sequence>>

After the bus reset, the respective nodes start to obtain a node ID so as to construct a new network construction. A general sequence from the bus reset to node-ID determination will be described with reference to the flowcharts of FIGS. 18 to 20. Note that this operation is realized by the link layer 1712 which generates a topology map of the network structure.

Figure 18:
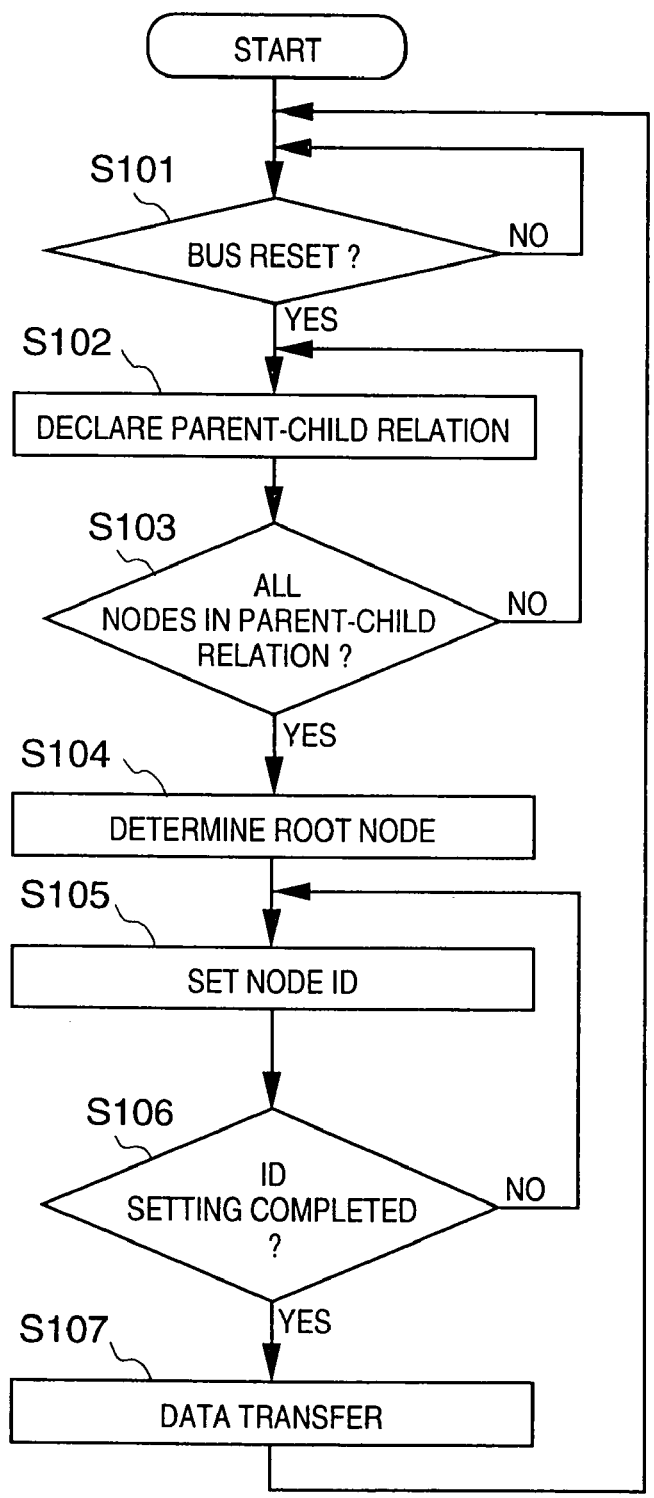
FIG. 18 is a flowchart showing processing of bus-reset to determination of node ID.

FIG. 18 is a flowchart showing a sequence from occurrence of bus-reset signal to node-ID determination and data transfer. At step S101, the respective nodes always monitor occurrence of bus-reset signal. When the bus-reset signal has occurred, the process proceeds to step S102, at which to obtain a new network construction in a state where the network construction has been reset, parent-child relation is declared between nodes connected to each other. Step S102 is repeated until it is determined at step S103 that the parent-child relation has been determined among all the nodes.

As the parent-child relation has been determined, the process proceeds to step S104, at which one "root (node)" is determined. At step S105, node-ID setting is performed so as to provide an ID to the respective nodes. The node-ID setting is made in a predetermined order of the nodes. Step S105 is repeated until it is determined at step S106 that the ID's have been given to all the nodes.

As the node-ID setting has been completed, since the new network construction has been recognized by all the nodes, data transfer among the nodes is possible. At step S107, data transfer is started, and the process returns to step S101, at which occurrence of bus-reset signal is monitored again.

Figure 19:
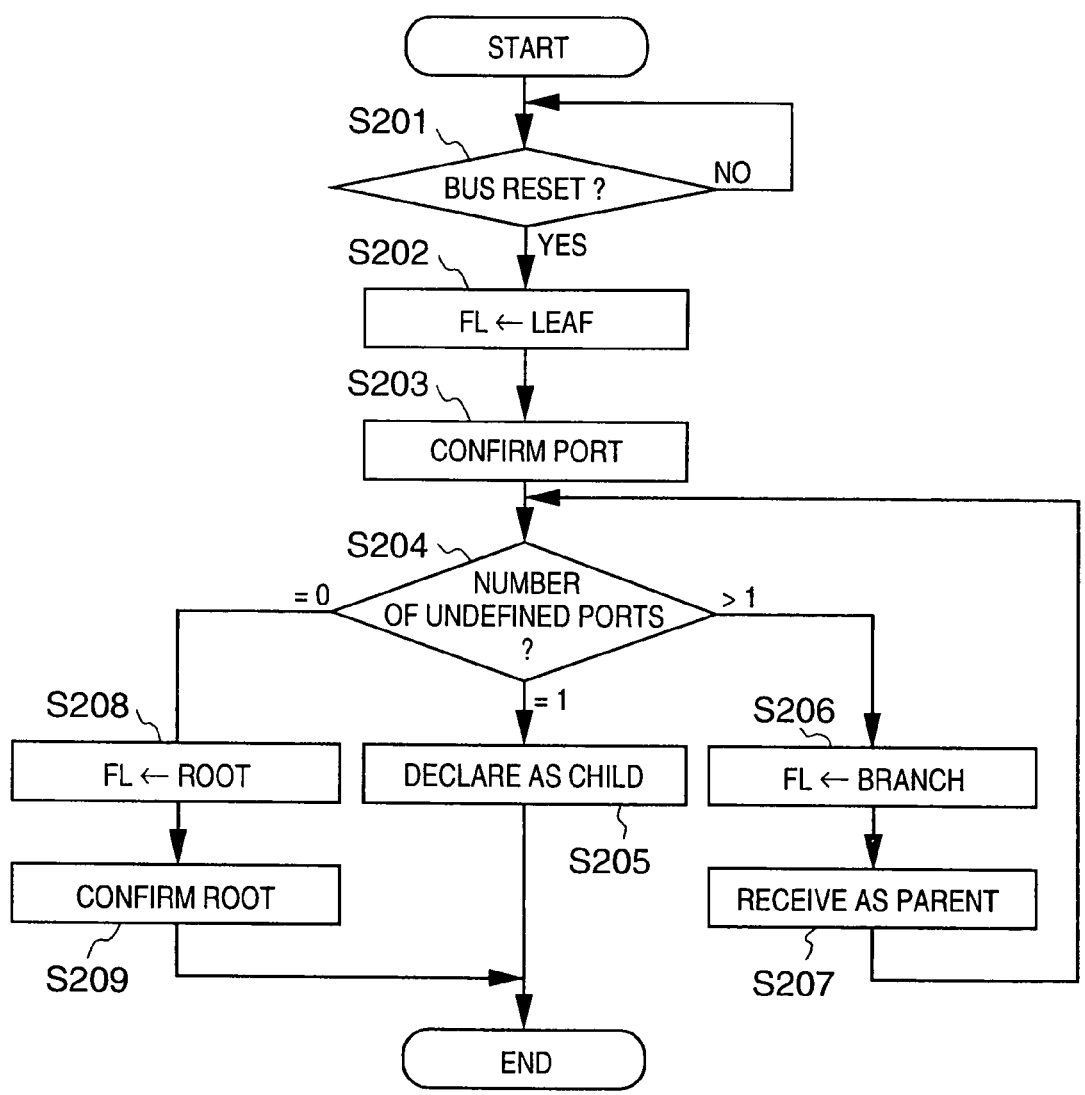
FIG. 19 is a flowchart showing determination processing of child-parent relation at bus-reset.
Figure 20:
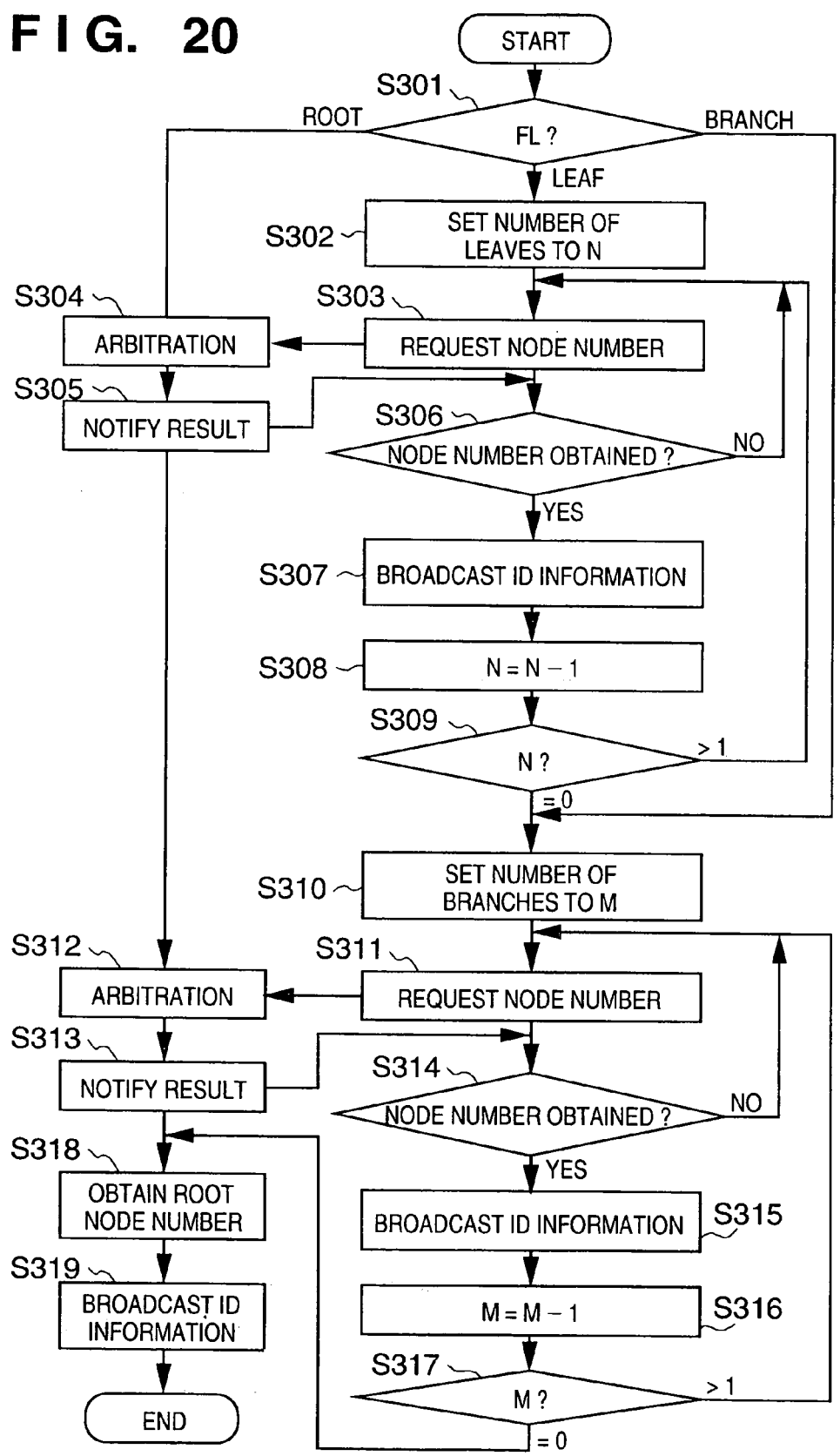
FIG. 20 is a flowchart showing determination processing of node ID after determining of child-parent relation at bus-reset.

FIG. 19 is a flowchart showing the sequence from the monitoring of bus-reset signal (S101) to the root determination (S104) in detail. FIG. 20 is a flowchart showing the node-ID setting (S105 and S106) in detail.

In FIG. 19, at step S201, the occurrence of bus-reset signal is monitored, and as the bus-reset signal has occurred, the network construction is reset. Next, at step S202, as a first step for re-recognizing the reset network construction, the respective devices reset its flag FL with data indicative of "leaf (node)". At step S203, the respective devices examine the number of ports, i.e., the number of other nodes connected to them. At step S204, based on the result of examination at step S203, the devices examine the number of undefined (i.e., parent-child relation has not been determined) ports. The number of undefined ports is equal to that of the ports immediately after the bus reset, however, with the progress of determination of parent-child relation, the number of undefined ports detected at step S204 decreases.

Only actual leaf(ves) can declare parent-child relation immediately after the bus reset. Whether or not the node is a leaf is detected from the number of ports examined at step S203; i.e., if the number of ports is "1", the node is a leaf. The leaf declares that "this node is a child, and the connected node is a parent" at step S205, then terminates the operation.

On the other hand, a node that detected at step S203 that the number of ports is "two or more" is a "branch". Immediately after the bus reset, as "undefined ports>1"

holds, the process proceeds to step S206, at which the flag FL is set with data indicative of "branch", then declaration of parent-child relation from another node is waited at step S207. When the parent-child relation is declared from another node, the process returns to step S204 at which the branch examines the number of undefined ports. If the number of undefined ports is "1", the branch can declare at step S205 that "this node is a child, and the connected node is a parent" to the node connected to the remaining port. If the number of undefined ports is still "two or more", the branch waits for declaration of parent-child relation from another node at step S207.

When any one of the branches (or exceptionally leaf(ves) which delayed declaring a child) detects that the number of undefined ports is "0", the parent-child declaration of the overall network has been completed. The only node that has "0" undefined port, i.e., the parent of all the nodes, sets the flag FL with data indicative of a "root" at step S208. Then at step S209, the node is recognized as a root.

In this manner, the procedure from the bus reset to the parent-child declaration among all the nodes in the network ends.

Next, a procedure of providing each node with an ID will be described. First, the ID setting is performed at the leaves. Then, ID's are set in numerical order (from node number: 0) from leaves→branches→root.

In FIG. 20, at step S301, the process splits in accordance with node type, i.e., leaf, branch or root, based on the data set at the flags FL.

In case of leaf, at step S302, the number of leaves (natural number) in the network is set to a variable N. At step S303, the respective leaves request a node number to the root. If a plurality of requests have been made, the root performs arbitration at step S304, and provides a node number to one node at step S305, while notifies the other nodes of the result of acquisition of node-number indicating that the node number has been failed.

A leaf that has not obtained a node number (NO at step S306) repeats the request for node number at step S303. On the other hand, a leaf that has obtained a node number notifies all the nodes of the obtained node number by broadcasting ID information including the node number. As the broadcasting of the ID information has been completed, the variable N indicative of the number of leaves is decremented at step S308. Then, from the determination at step S309, the procedure from step S303 to step S308 is repeated until the variable N becomes "0" in the determination at step S309. When ID information on all the leaves have been broadcasted, the process proceeds to step S310, for setting ID's of branches.

The ID setting for branches is performed substantially similar to the ID setting for the leaves. First, at step S310, the number of branches (natural number) is set to a variable M. At step S311, the respective branches request the root for a node number. In response to the requests, the root performs arbitration at step S312, and provides a node number, subsequent to the last leaf node number, to a branch at step S313, while notifies the other branches of the result of acquisition of node-number indicating that the node number has been failed.

A branch that has not obtained a node number (NO at step S314) repeats the request for node number at step S315. On the other hand, a branch that has obtained a node number notifies all the nodes of the obtained node number by broadcasting ID information including the node number. As the broadcasting of the ID information has been completed, the variable M indicative of the number of branches is decremented at step S316. Then, from the determination at step S317, the procedure from step S311 to step S316 is repeated until the variable M becomes "0" in the determination at step S317. When ID information on all the leaves have been broadcasted, the process proceeds to step S318, for setting the ID of the root.

At this time, it is only the root that has not obtained a node ID. At step S318, the root obtains the smallest number that has not been provided to any other node as the node ID of the root, and at step S319, broadcasts ID information on the root.

As described above, the procedure until the node ID's for all the nodes have been set ends. Next, the sequence of node ID determination will be described with reference to the network example shown in FIG. 21.

Figure 21:
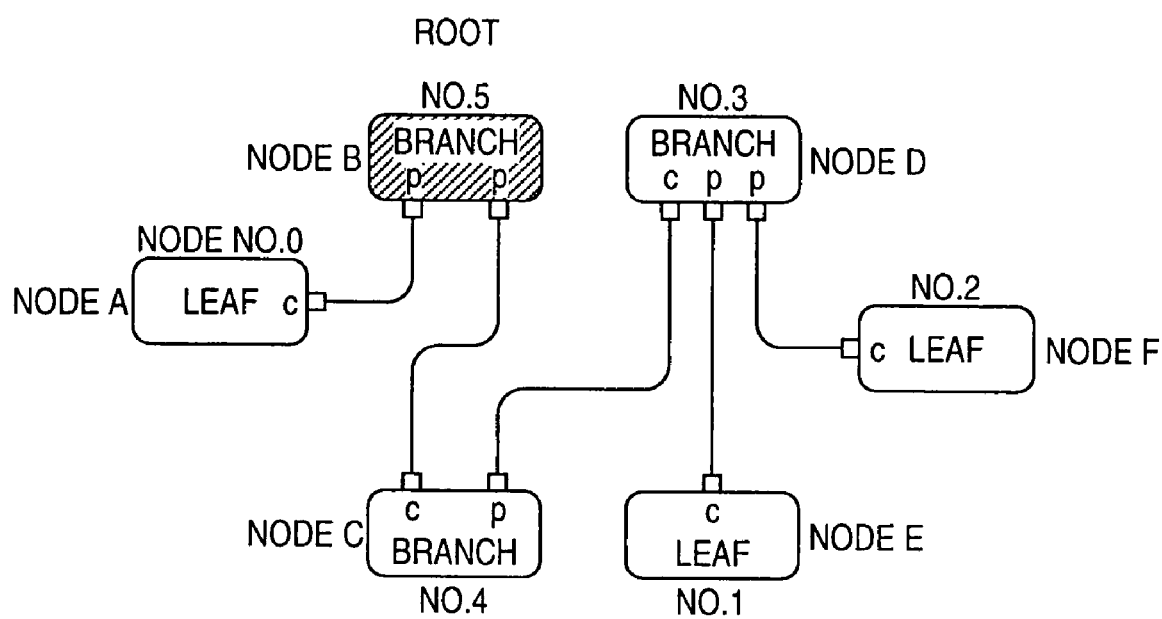
FIG. 21 is a block diagram showing an example of the network.

In the network in FIG. 21, a node B as a root is directly connected to its lower nodes A and C; the node C is directly connected to its lower node D; and the node D is directly connected to its lower nodes E and F. The procedure of determining this hierarchical structure, the root node and the node ID's will be described below.

After the bus reset has occurred, to recognize connection statuses of the respective nodes, parent-child relation is declared between ports of directly connected nodes. "parent" means a node at an upper level and "child" means a node at a lower level in the hierarchical structure. In FIG. 21, the node that first declared parent-child relation after the bus reset is the node A. As described above, nodes (leaves) where only one port is connected can start declaration of parent-child relation. That is, if the number of ports is "1", it is recognized that the node is the end of the network tree, i.e., a leaf. The declaration of parent-child relation is started from the leaf which has first taken action among these leaves. Thus, a port of the leave node is set as a "child", while the port of another node connected to the leave node is set as a "parent". In this manner, "child-parent" relation is sequentially set between the nodes A and B, between the nodes E and D, and between the nodes F and D.

Further, among upper nodes having a plurality of ports, i.e., branches, parent-child relation is sequentially declared with respect to upper node(s), from the node that first received declaration of parent-child relation from the leaf. In FIG. 21, first parent-child relation is determined between the nodes D and E and between the nodes D and F. Then the node D declares parent-child relation with respect to the node C, and as a result, a relation "child-parent" is set between the nodes D and C. The node C, that has received the declaration of parent-child relation from the node D, declares parent-child relation with respect to the node B connected to the other port, thus "child-parent" relation is set between the nodes C and B.

In this manner, the hierarchical structure as shown in FIG. 21 is constructed as a topology map by the link layer 1712. The node B, that has finally become the parent at all the ports, is determined as a root. Note that a network has only one root. In a case where the node B that has received declaration of parent-child relation from the node A immediately declares parent-child relation with respect to another node, the other node, e.g., the node C, may be the root node. That is, any node may be a root depending upon timing of transmitting declaration of parent-child relation, and further, even in a network maintaining the same construction, a particular node is not always become a root.

As the root has been determined, the sequence of determining the respective node ID's is started. Each node has a broadcast function to notify its ID information to all the other nodes. ID information includes a node number, information on a connected position, the number of ports, the number of ports connected to other nodes, information on parent-child relation on the respective ports and the like.

As described above, the assignment of node numbers is started from the leaves. In numerical order, node number=0, 1, 2, . . . is assigned. Then, by the broadcasting of ID information, it is recognized that the node number has been assigned.

As all the leaves have obtained a node number, node numbers are assigned to the branches. Similar to the assignment of node numbers to the leaves, ID information is broadcasted from the branch that received a node number, and finally, the root broadcasts its ID information. Accordingly, the root always has the larger node number.

Thus, as the ID setting of the overall hierarchical structure has been completed and the network has been constructed, then the bus initialization is completed.

<<Arbitration>>

Next, the bus arbitration in the physical layer 1711 will be described.

The 1394 serial bus always performs arbitration of a bus-use right prior to data transfer. The devices connected to the 1394 serial bus respectively relay a signal transferred on the network, thus constructing a logical bus-type network transmitting the signal to all the devices within the network. This necessitates bus arbitration to avoid packet conflict. As a result of bus arbitration, one node can transfer data during a certain period.

Figure 22A:
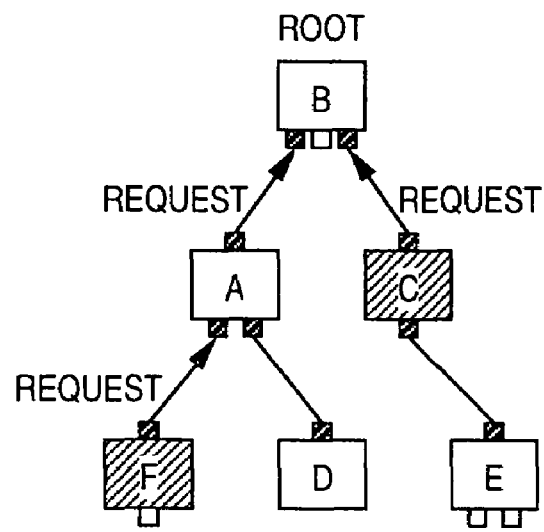
FIGS. 22A and 22B are block diagrams explaining arbitration in the IEEE1394 serial bus.
Figure 22B:
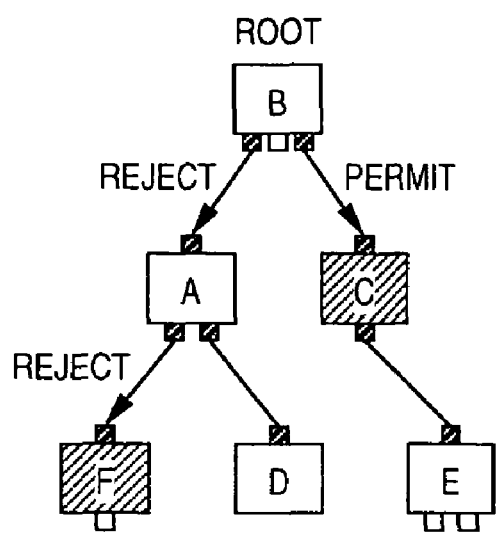

FIGS. 22A and 22B are block diagrams explaining the bus arbitration. FIG. 22A shows operation to request a bus use right; and FIG. 22B, operation to allow to use the bus.

When the bus arbitration is started, a single or plurality of nodes respectively request a bus use right to use the bus to its parent node. In FIG. 22A, the nodes C and F request a bus use right. The parent node (node A in FIG. 22A) that has received the request relays the request by further requesting a bus use right to its parent node. The request is forwarded to a root that finally performs arbitration.

The root node that has received the request for bus use right determines a node to be provided with the bus use right. This arbitration can be performed only by the root node. The node that dominated in the arbitration is provided with the bus use right. FIG. 22B shows that the node C has obtained the bus use right and the request from the node F has been rejected.

The root sends a DP (data prefix) packet to nodes lost in the bus arbitration so as to notify that their requests have been rejected. The requests from those nodes are held by the next bus arbitration.

Thus, the node that obtained the bus use permission starts data transfer.

Figure 23:
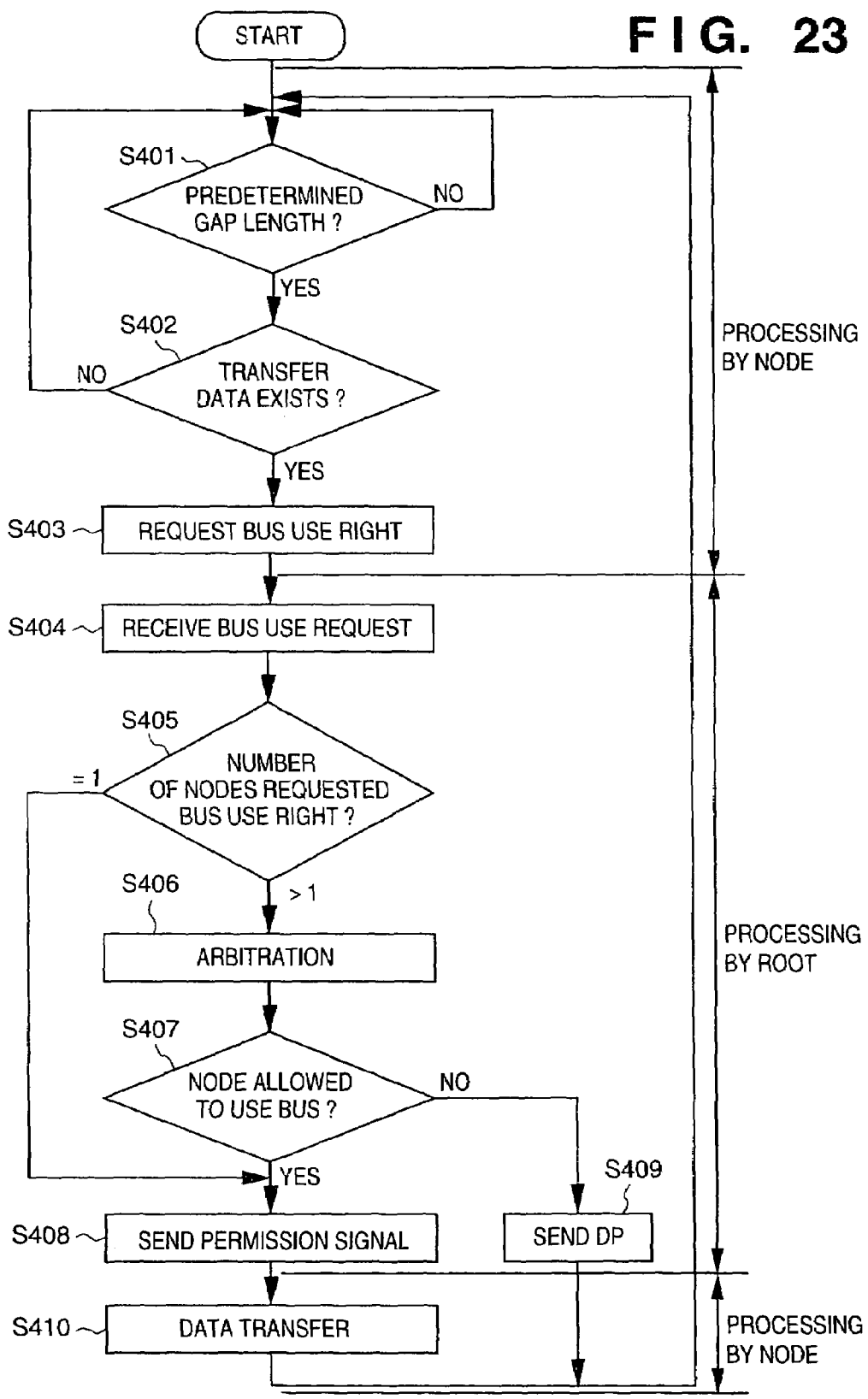
FIG. 23 is a flowchart explaining arbitration.

The sequence of the bus arbitration will be described with reference to the flowchart of FIG. 23.

To start data transfer by a node, the bus must be in idle status. To confirm that data transfer has been completed and the bus is currently in idle status, each node detects a gap length of a predetermined idle period (e.g., sub-action gap) set in each transfer mode, and it determines whether or not the bus is currently in idle status based on the detection result.

At step S401, the node determines whether or not a predetermined gap length corresponding to asynchronous data or isochronous data to be transferred has been detected. So far as the node has not detected the predetermined gap length, it cannot request a bus use right to start data transfer, accordingly, the node waits until the predetermined gap length has been detected.

When the predetermined gap length has been detected at step S401, the node determines whether or not there is data to be transferred at step S402. If YES, it issues a signal requesting a bus use right to the root at step S403. As shown in FIG. 22, this signal requesting the bus use right is relayed by the respective devices in the network, and forwarded to the root. If it is determined at step S402 that there is no data to be transferred, the process returns to step S401.

At step S404, if the root has received a single or plurality of request signals for the bus use right, it examines the number of nodes requesting the bus use right at step S405. From the determination at step S405, if the number of the nodes requested the bus use right is one, that node is provided with bus use permission immediately after the requirement. On the other hand, if the number of the nodes is more than one, arbitration is performed to determine one node to be provided with the bus use right immediately after the requirement. The arbitration does not always provide a bus use right to the same node, but equally provides a bus use right to the respective nodes (fair arbitration).

The processing at the root node branches at step S407 into processing for the node dominated in the arbitration at step S406, and processing for the other nodes lost in the arbitration. In a case where there is one node that requested the bus use right, or one node has dominated in the arbitration, the node is provided with an permission signal indicative of bus use permission at step S408. The node starts data (packet) transfer immediately after it receives the permission signal (step S410). On the other hand, the nodes lost in the arbitration receive a DP (data prefix) packet indicative of rejection of the bus use request at step S409. The processing for the node that received the DP packet returns to step S401 to request a bus use right again. Also, the processing for the node that completed data transfer at step S410 returns to step S401.

<<Asynchronous Sub-Action>>

The asynchronous transfer mode (ATM) which is one of the data transfer modes with 1394 serial bus will be described below.

The asynchronous sub-action is asynchronous data transfer.

Figure 24:
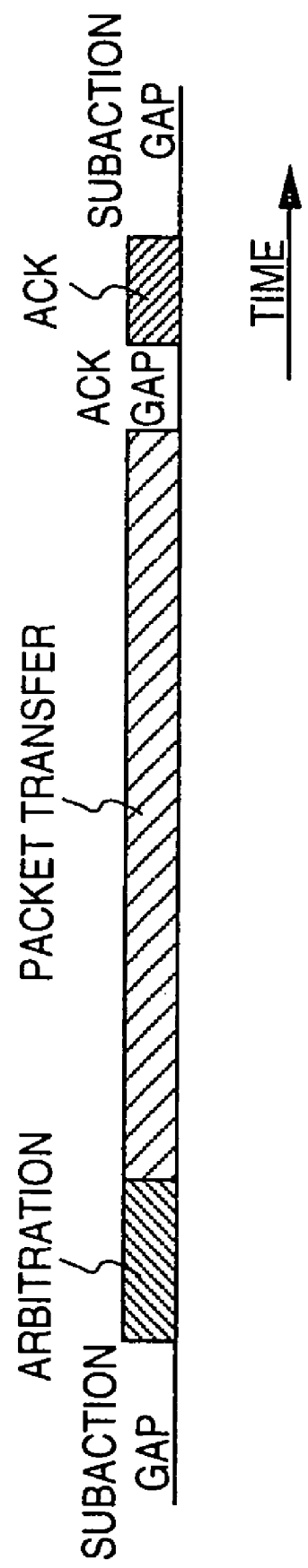
FIG. 24 is a timing chart showing transitional statuses in asynchronous data transfer.

FIG. 24 shows transition in the asynchronous transfer. In FIG. 24, the first sub-action gap represents the idle status of the bus. At a point where the idle time has become a predetermined value, a node which is to perform data transfer requests a bus use right, then bus arbitration is executed.

When the use of bus has been allowed by the arbitration, data in the form of packet is transferred, and a node which receives the data sends a reception acknowledgment code ACK as a response, or sends a response packet after a short gap called ACK gap, thus the data transfer is completed. The code ACK comprises 4-bit information and a 4-bit checksum. The code ACK, including information indicative of success, busy or pending status, is immediately sent to the data-sender node.

Figure 25:
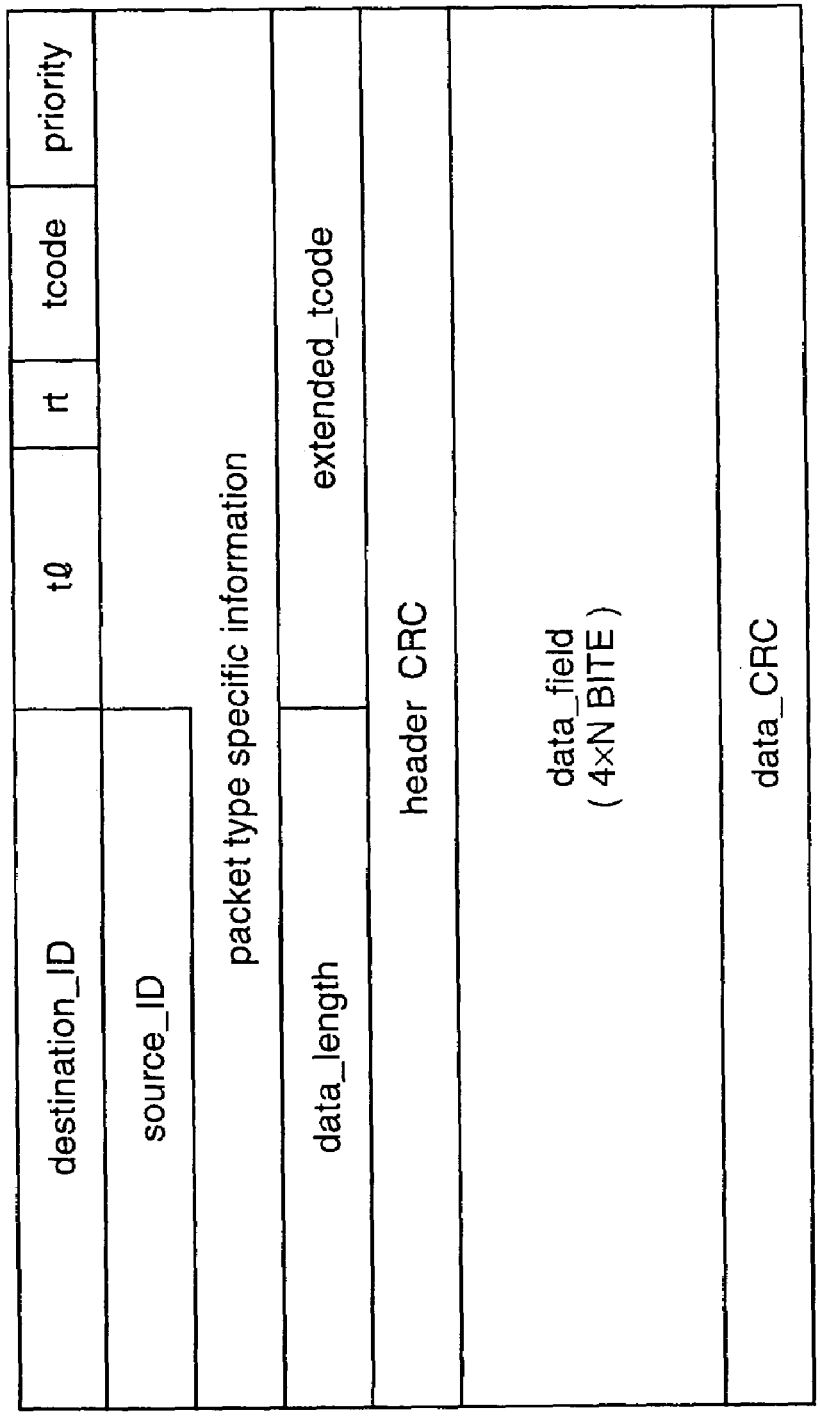
FIG. 25 is a diagram showing an example of a packet format for the asynchronous transfer.

FIG. 25 shows a packet format for asynchronous transfer. The packet has a data area, a data CRC area for error correction, and a header area in which a destination node ID, a source node ID, a transfer data length and various codes are written.

The asynchronous transfer is one-to-one communication from a sender node to a receiver node. A packet sent from the sender node is relayed by the respective nodes in the network, however, as these nodes are not designated as the receiver of the packet, they ignore the packet, then only the receiver node designated by the sender node receives the packet.

<<Isochronous Sub-Action>>

The isochronous transfer mode (ITM) which is an another data transfer modes with 1394 serial bus will be described below.

The isochronous sub-action is isochronous data transfer.

Isochronous transfer, which can be regarded as the greatest feature of the 1394 serial bus is appropriate to multimedia data transfer which requires realtime transfer of, especially, AV data.

Further, the asynchronous transfer is one-to-one transfer, whereas the isochronous transfer is broadcasting transfer from one sender node to all the other nodes.

Figure 26:
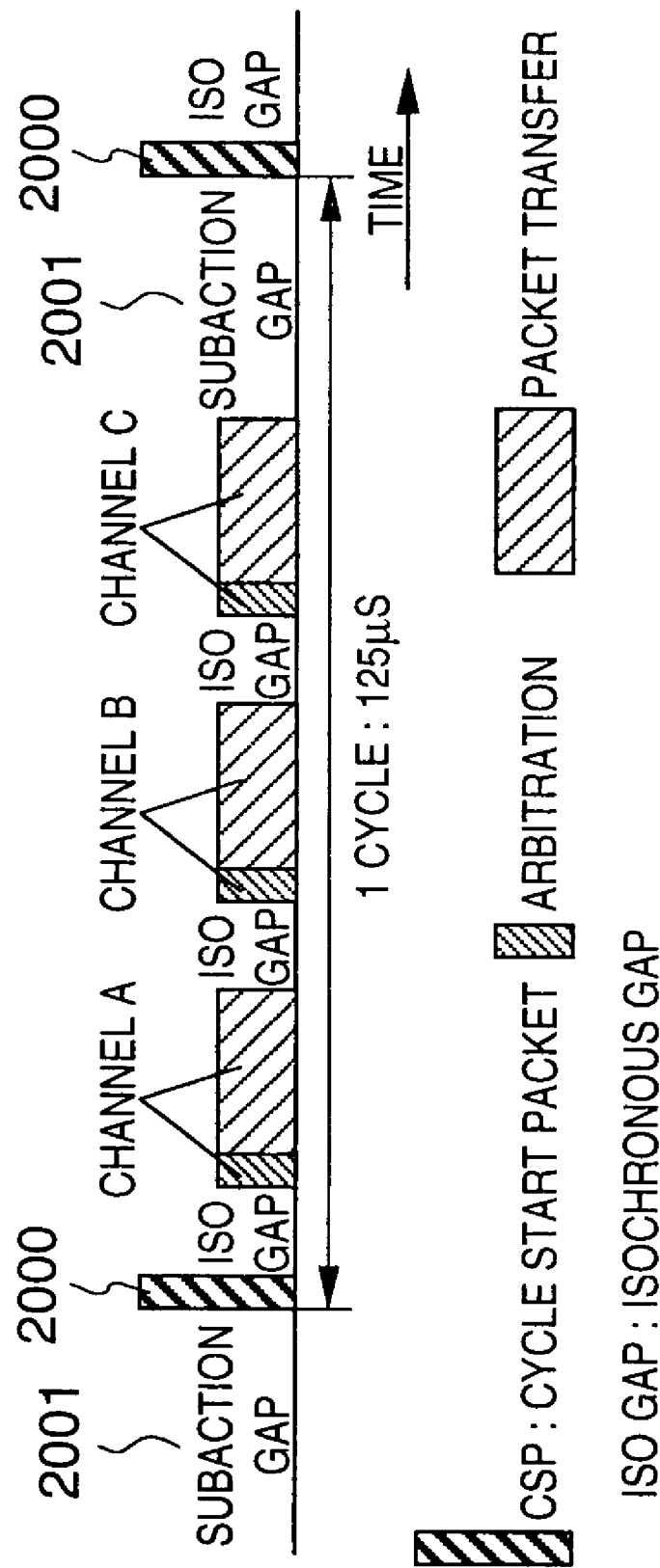
FIG. 26 is a timing chart showing transitional statuses in isochronous data transfer.

FIG. 26 shows transition in the isochronous transfer. The isochronous transfer is executed on the bus in a predetermined cycle, called "isochronous cycle" The period of the isochronous cycle is 125 µs. A cycle start packet (CSP) indicates the start of the isochronous cycle for synchronizing the operations of the respective nodes. When data transfer in a cycle has been completed and a predetermined idle period (sub-action gap) has elapsed, a node which is called "cycle master" sends the CSP indicative of the start of the next cycle. That is, this interval between the issuance of CSP's is 125 µs.

As channel A, channel B and channel C in FIG. 26, the respective packets are provided with a channel ID, so that plural types of packets can be independently transferred within one isochronous cycle. This enables substantially-realtime transfer among the plural nodes. The receiver node can receive only data with a predetermined channel ID. The channel ID does not indicate an address of the receiving node, but merely indicates a logical number with respect to the data. Accordingly, one packet sent from a sender node is transferred to all the other nodes, i.e., broadcasted.

Similar to the asynchronous transfer, bus arbitration is performed prior to the packet broadcasting in isochronous transfer. However, as the isochronous transfer is not one-to-one communication like the asynchronous transfer, the reception acknowledgment code ACK used as a response in the asynchronous transfer is not used in the isochronous transfer.

Further, an isochronous gap (iso gap) in FIG. 26 represents an idle period necessary for confirming prior to isochronous transfer that the bus is in idle status. If the predetermined idle period has elapsed, bus arbitration is performed with respect to node(s) desiring isochronous transfer.

FIG. 27 shows a packet format for isochronous transfer. Various packets divided into channels respectively have a data field, a data CRC field for error correction and a header field containing information such as a transfer-data length, a channel No., various codes and error-correction header CRC as shown in FIG. 27.

<<Bus Cycle>>

Figure 28:
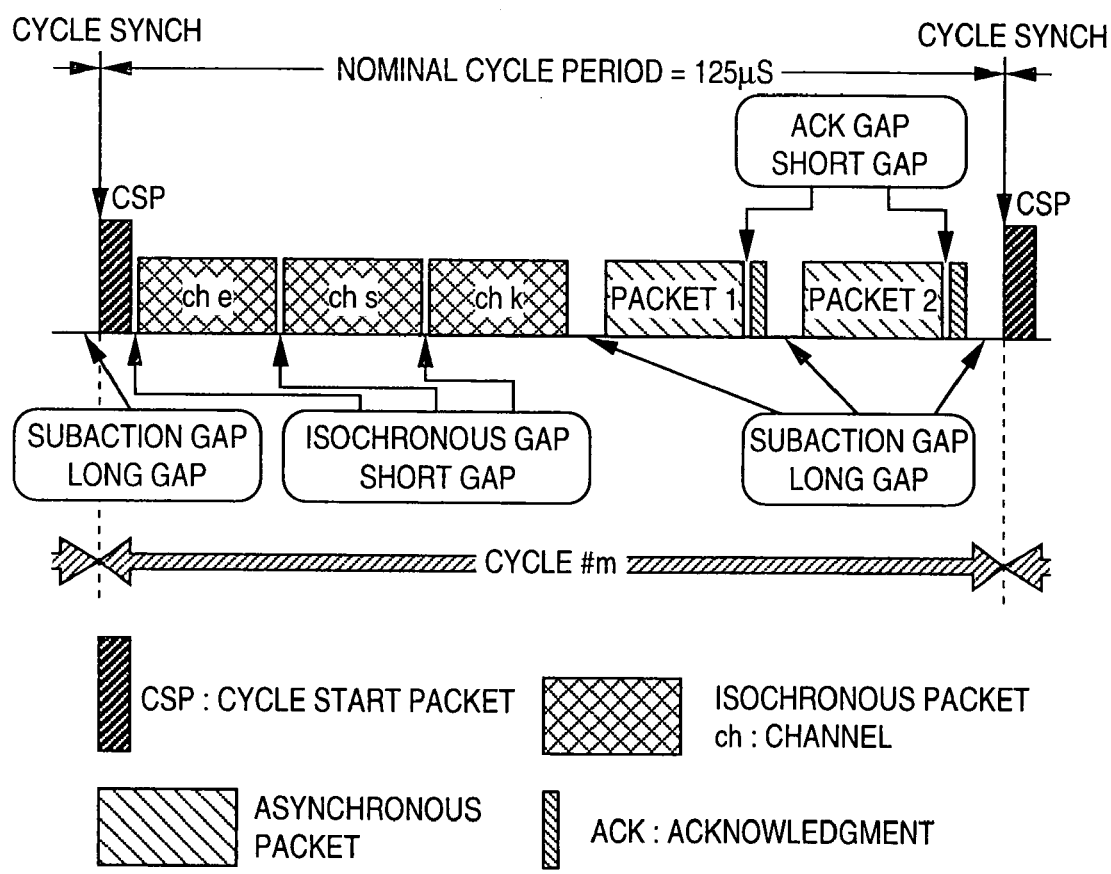
FIG. 28 is a timing chart showing transitional statuses in data transfer on the serial bus when the isochronous transfer and asynchronous transfer are mixedly performed.

In practice, both isochronous transfer and asynchronous transfer can be mixedly performed on the 1394 serial bus. FIG. 28 shows transition in the isochronous transfer and asynchronous transfer mixedly performed on the 1394 serial bus.

The isochronous transfer is performed prior to the asynchronous transfer because after the CSP, the isochronous transfer can be started with a gap (isochronous gap) shorter than the idle period necessary for starting the asynchronous transfer. Accordingly, the isochronous transfer has priority over the asynchronous transfer.

In the typical bus cycle as shown in FIG. 28, upon starting the cycle #m, a CSP is transferred from the cycle master to the respective nodes. The operations of the respective nodes are synchronized by this CSP, and node(s) that waits for a predetermined idle period (isochronous gap) to perform isochronous transfer participates in bus arbitration, then starts packet transfer. In FIG. 28, a channel e, a channel s and a channel k are transferred by the isochronous transfer.

The operation from the bus arbitration to the packet transfer is repeated for the given channels, and when the isochronous transfer in the cycle #m has been completed, the asynchronous transfer can be performed. That is, when the idle period has reached the sub-action gap for the asynchronous transfer, node(s) that is to perform the asynchronous transfer participates in bus arbitration. Note that only if the sub-action gap for starting the asynchronous transfer is detected, after the completion of isochronous transfer and before the next timing to transfer the CSP (cycle synch), the asynchronous transfer can be performed.

In the cycle #m in FIG. 28, the isochronous transfer for three channels is performed, and then two packets (packet 1 and packet 2) including ACK are transferred by the asynchronous transfer. When the asynchronous packet 2 has been transferred, as the next cycle synch point to start the subsequent cycle m+1 comes, the transfer in the cycle #m ends. Note that during the asynchronous or isochronous transfer, if the next cycle synch point to transfer the next CSP has come, the transfer is not forcibly stopped but continued. After the transfer has been completed, a CSP for the next cycle is transferred after a predetermined idle period. That is, when one isochronous cycle is continued for more than 125 µs, the next isochronous cycle is shorter than the reference period 125 µs. In this manner, the isochronous cycle can be lengthened or shortened based on the reference period 125 µs.

However, it may be arranged such that the isochronous transfer is performed in every cycle, while the asynchronous transfer is sometimes postponed until the next cycle or the cycle further subsequent to the next cycle, so as to maintain realtime transfer. The cycle master also manages information on such delay.

[Print System]

A print system according to the first embodiment will be described by mainly exemplifying a digital copying machine controller as a constituent.

<<General Configuration of System>>

Figure 1:
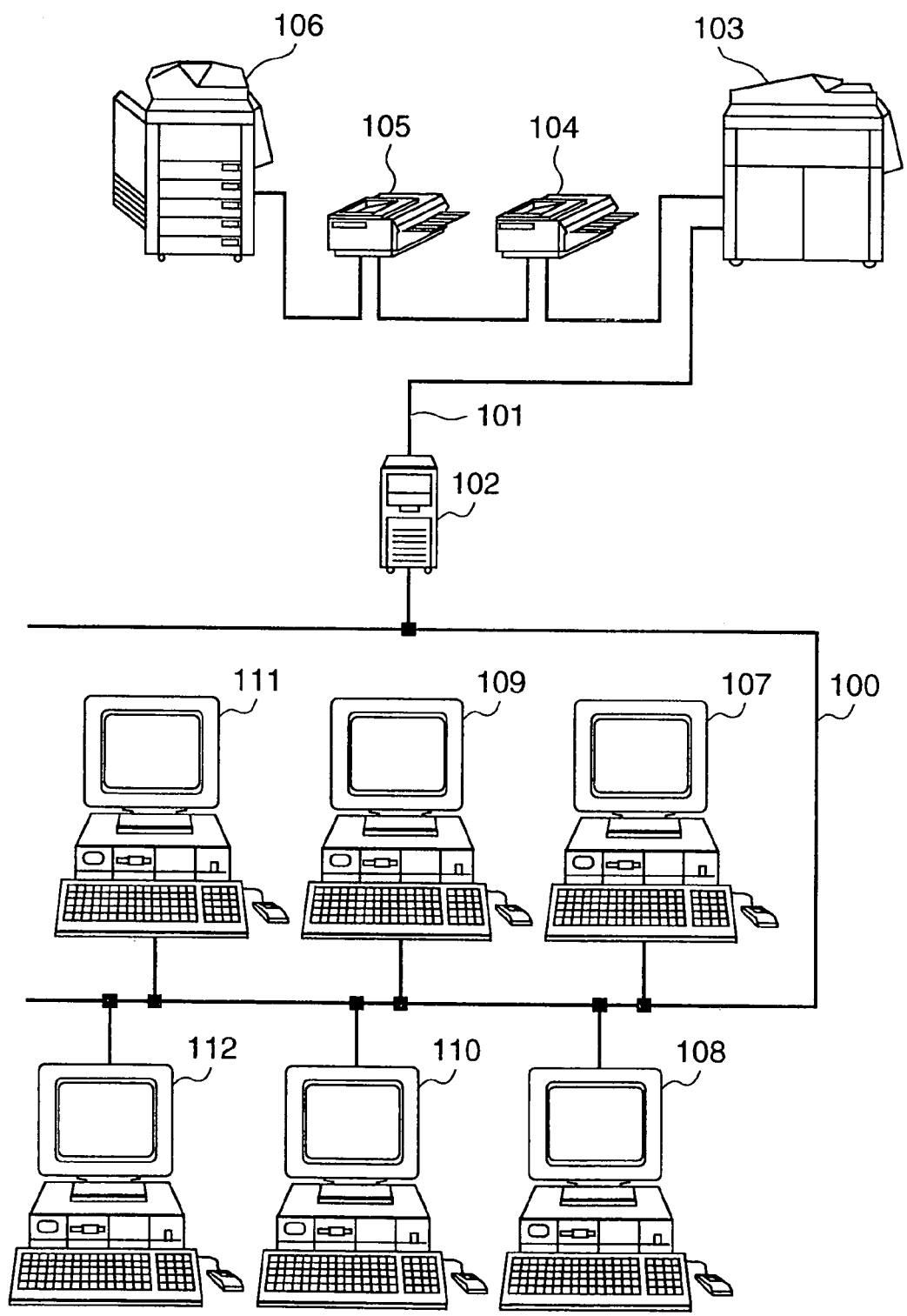
FIG. 1 a diagram showing the configuration of a network print system in an embodiment according to the present invention.
Figure 2:
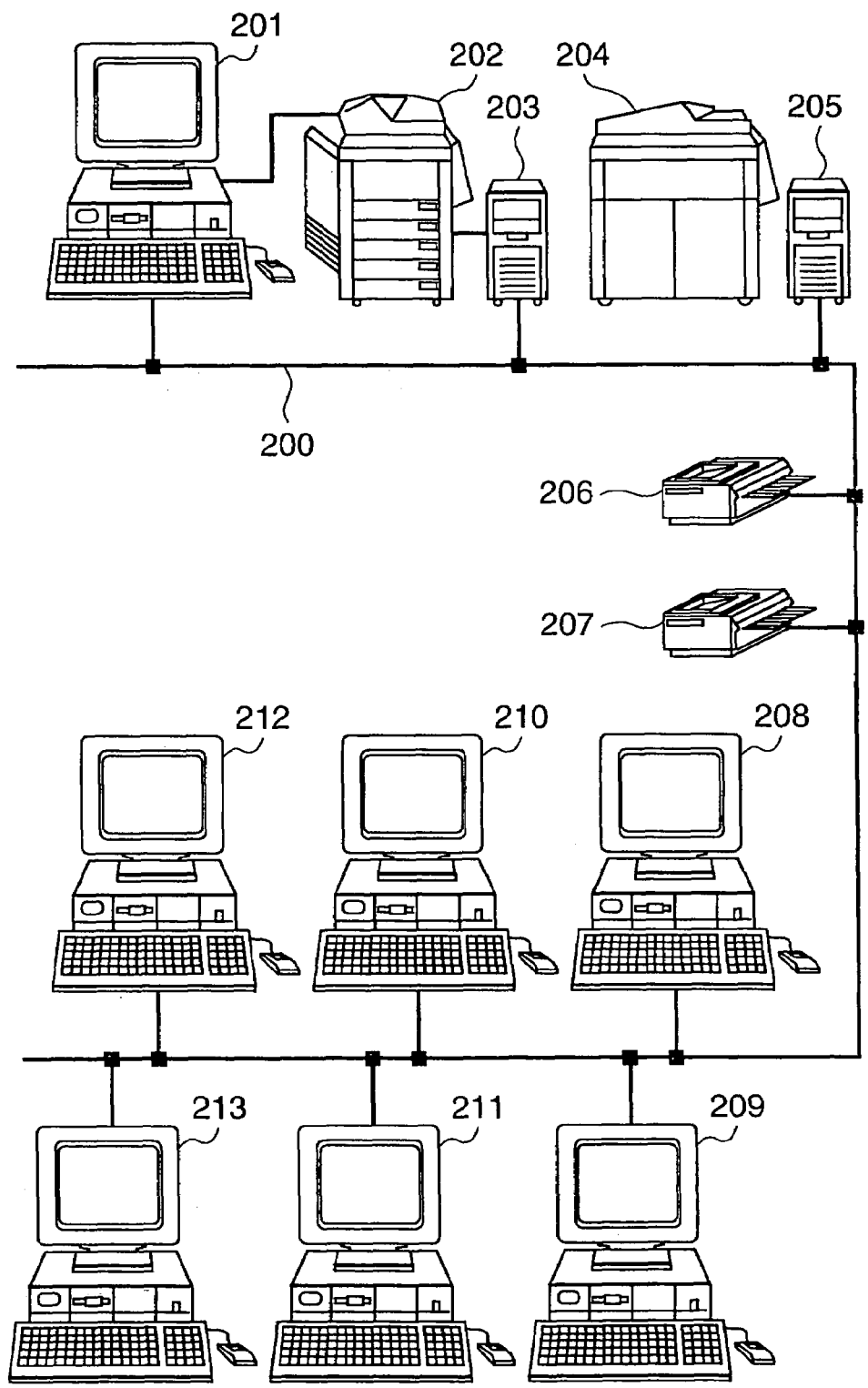
FIG. 2 is a diagram showing the configuration of a conventional office network.

FIG. 1 is a diagram showing the general configuration of the print system to which a plurality of image processing devices including a digital copying machine are connected by a network in the first embodiment. In FIG. 1, reference numeral 100 denotes a network such as an Ethernet connected to personal computers and printers; 101, a network (to be referred to as an image network) for transferring images; and 102, an image data controller (to be simply referred to as a controller hereinafter) for controlling input/output of image data. Reference numeral 103 denotes a color copying machine; 104 and 105, printers; and 106, a monochrome digital copying machine. The components 103 to 106 are connected to the image network 101. Reference numerals 107, 108, 109, 110, 111 and 112 denote personal computers (to be referred to as PCs) connected to the network 100. In printout from the PC side, image data is sent to a desired printer or copying machine via the network 100, controller 102 and image network 101.

Figure 3:
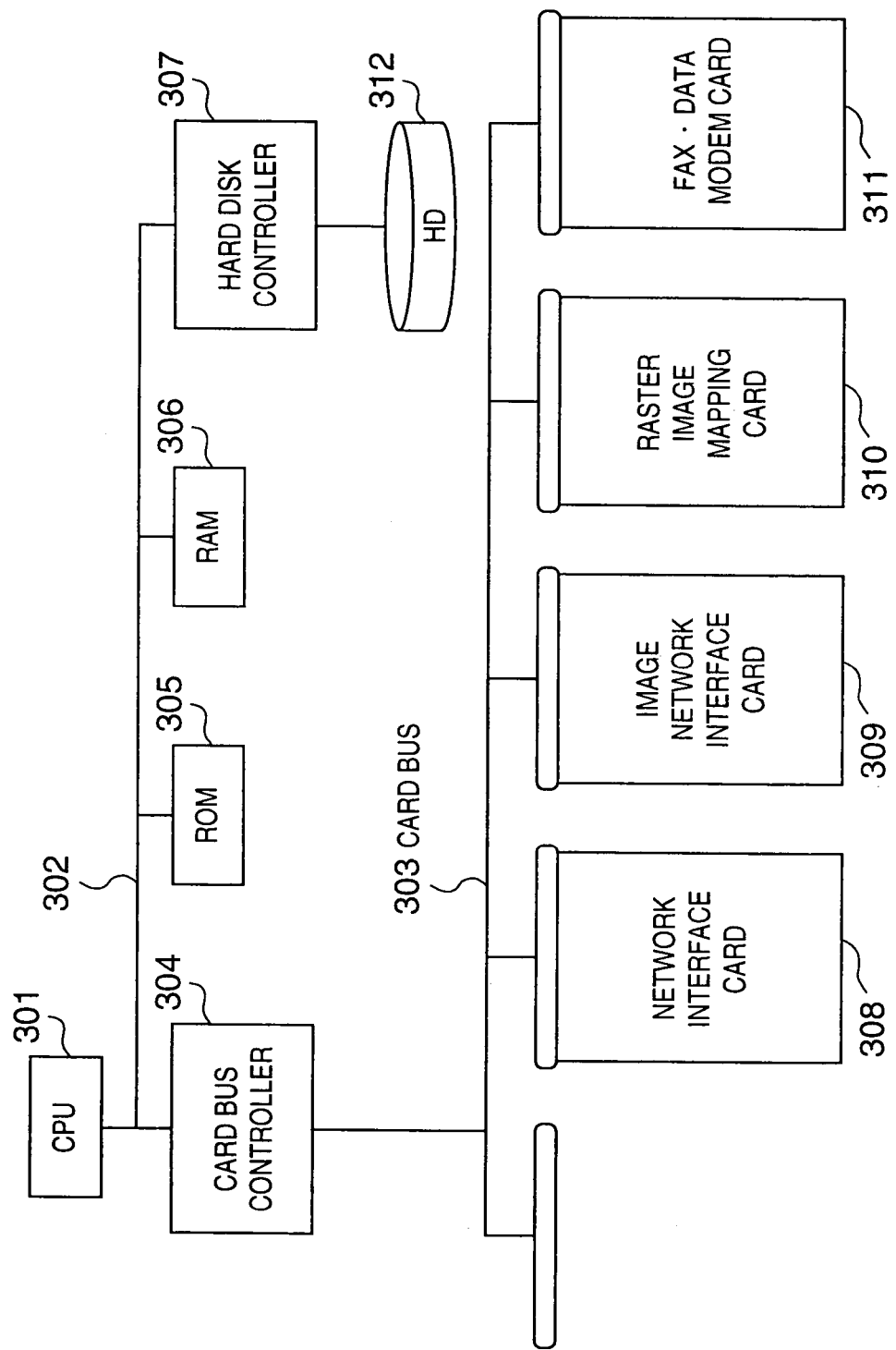
FIG. 3 is a block diagram showing the detailed construction of a controller.

The controller 102 will be explained. FIG. 3 is a block diagram showing the construction of the controller 102. In FIG. 3, reference numeral 301 denotes a CPU on the controller 102, which controls transmission/reception of data to/from the PC and printer in the network. Reference numeral 302 denotes a data bus for the CPU 301, which is connected to a card bus controller 304, ROM 305, RAM 306 and hard disk controller 307 (to be described next). The card bus controller 304 controls a card bus 303 for mounting a functional board for adding a function to the controller 102. The ROM 305 is a program memory storing control software of the controller 102. Part of the program area is formed from a flash ROM to allow a rewrite from a FAX-data modem 311 (to be described later) or interface terminal (not shown) via a telephone line. The RAM 306 is formed from a DRAM or SRAM, is generally used as a program work area, and can also be used as an image data memory. The hard disk controller 307 controls a read/write from/in a hard disk 312. The hard disk 312 is used to accumulate image data and store program software. In accumulating image data, image data compressed by the hard disk controller 307 is stored in the hard disk 312. In reading out the compressed data from the hard disk 312, data is expanded by the hard disk controller 307.

Respective functional boards connected to the card bus 303 will be explained. Reference numeral 308 denotes a network interface card which controls an interface for the network 100 connected to the PCs 107 to 112 and controller 102 shown in FIG. 1. The network interface card 308 makes it possible to install a corresponding card to a physical interface constructing the network 100 such as an Ethernet or token ring. An image network interface card 309 controls an interface for the image network 101 for performing transmission/reception of image data between the color copying machine 103, printers 104 and 105 and monochrome digital copying machine 106, and the controller 102 shown in FIG. 1.

The image network 101 must be constituted by a high-speed bus capable of transferring a large amount of image data. For this purpose, the first embodiment employs the aforementioned 1394 serial bus capable of high-speed transfer to the image network 101. However, the image network 101 is not limited to the 1394 serial bus, and can adopt any bus so long as a large amount of data can be transferred at high speeds.

A raster image mapping card 310 is used for mapping to bitmap data of a page descriptive language (PDL). The raster image mapping card 310 is not used when the printers 104 and 105 in the image network 101 can individually cope with the PDL. However, when, e.g., a so-called dam printer for only printing bitmap data is connected to the image network 101, the raster image mapping card 310 can be used to allow the PCs 107 to 112 in the network 100 to use the dam printer as a PDL printer. The printer can cope with various kinds of PDLs by replacing a functional board in the card bus. Further, when the program memory area of the raster image mapping card 310 is made rewritable, like a flash ROM or RAM, and raster image mapping programs for a plurality of PDLs are stored in the hard disk 312 in advance, the user can load a desired PDL from the hard disk 312 to the program memory of the raster image mapping card 310.

The FAX-data modem card 311 is connected to a telephone line to realize facsimile transmission/reception as a FAX modem or to realize communication with a remote PC or work station as a data modem.

<<Data Flow on Network>>

Operation of the controller 102 and a data flow in the network 100 will be described by exemplifying a case where PDL data is transmitted from the PCs 107 to 112 in the network 100 and printed out.

Assume that the PC 107 shown in FIG. 1 selects the printer 105 and designates PDL printing. In this case, PDL data output from the PC 107 is input to the controller 102 via the network 100. The PDL data is input to the raster image mapping card 310 via the network interface card 308 shown in FIG. 3.

Figure 5:
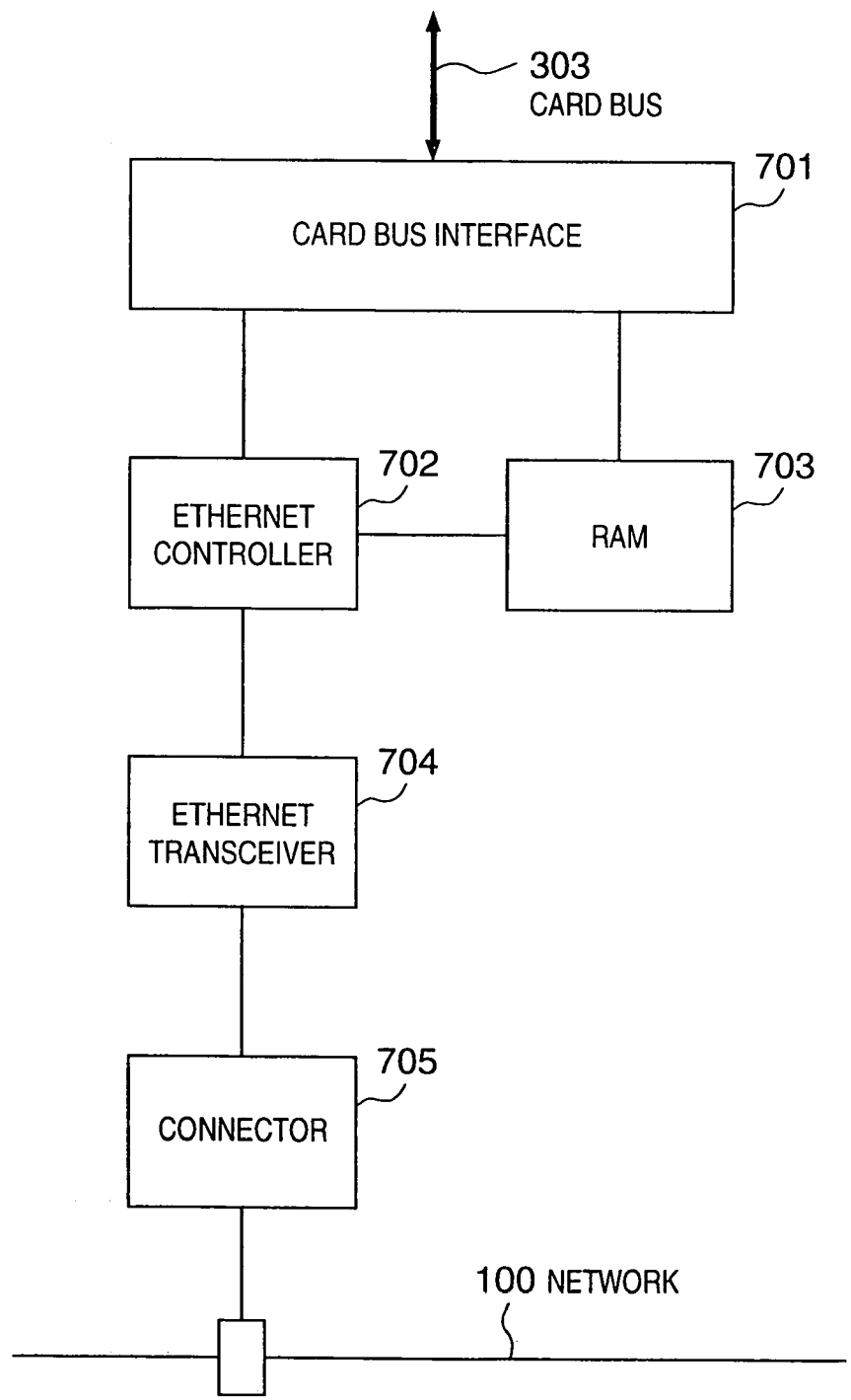
FIG. 5 is a block diagram showing the detailed construction of a network interface card.

FIG. 5 is a block diagram showing the detailed construction of the network interface card 308. Reference numeral 701 denotes a card bus interface; 702, an Ethernet controller for controlling a popular Ethernet protocol; 703, a RAM used as a data transmission/reception buffer; 704, an Ethernet transceiver including an interface part with a network-connected medium such as 110base2 or 10baseT; and 705, a connector corresponding to the network medium.

If the CPU 301 in the controller 102 determines that data transferred via the network interface card 308 is PDL data, it transfers the data to the raster image mapping card 310.

Figure 4:
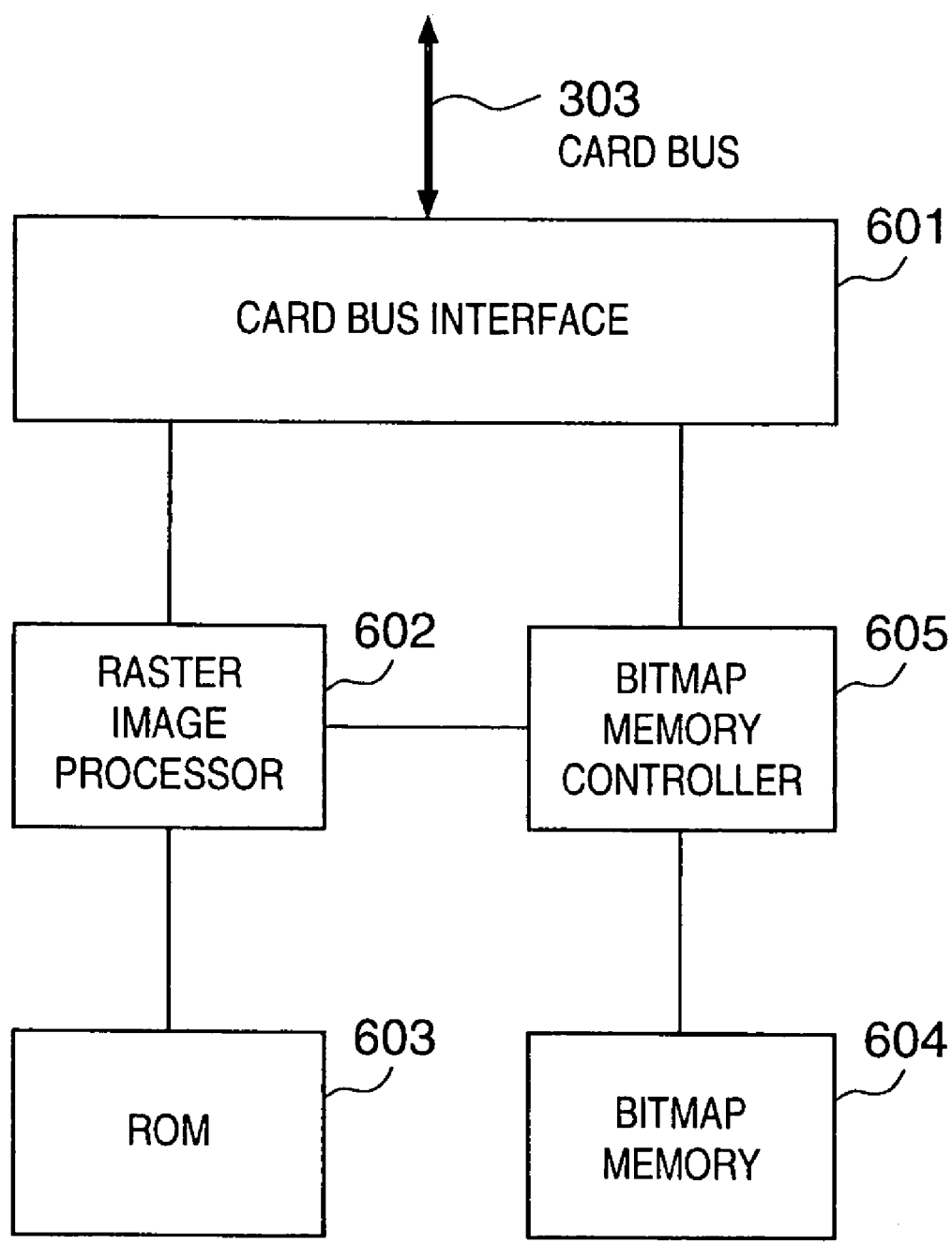
FIG. 4 is a block diagram showing the detailed construction of a raster image mapping card.

FIG. 4 is a block diagram showing the detailed construction of the raster image mapping card 310. Reference numeral 601 denotes a card bus interface; 602, a raster image processor for mapping PDL data into bitmap data; 603, a ROM serving as a program area for the raster image processor; 604, a bitmap memory for storing bitmap data; and 605, a bitmap memory controller for controlling a read/write from/in the bitmap memory 604. The PDL data input to the raster image mapping card 310 is sent via the card bus interface 601 to the raster image processor 602 where bitmap data is generated and stored in the bitmap memory 604 via the bitmap memory controller 605. The bitmap data thus mapped in the raster image mapping card 310 is transferred to the image network interface card 309.

Figure 6:
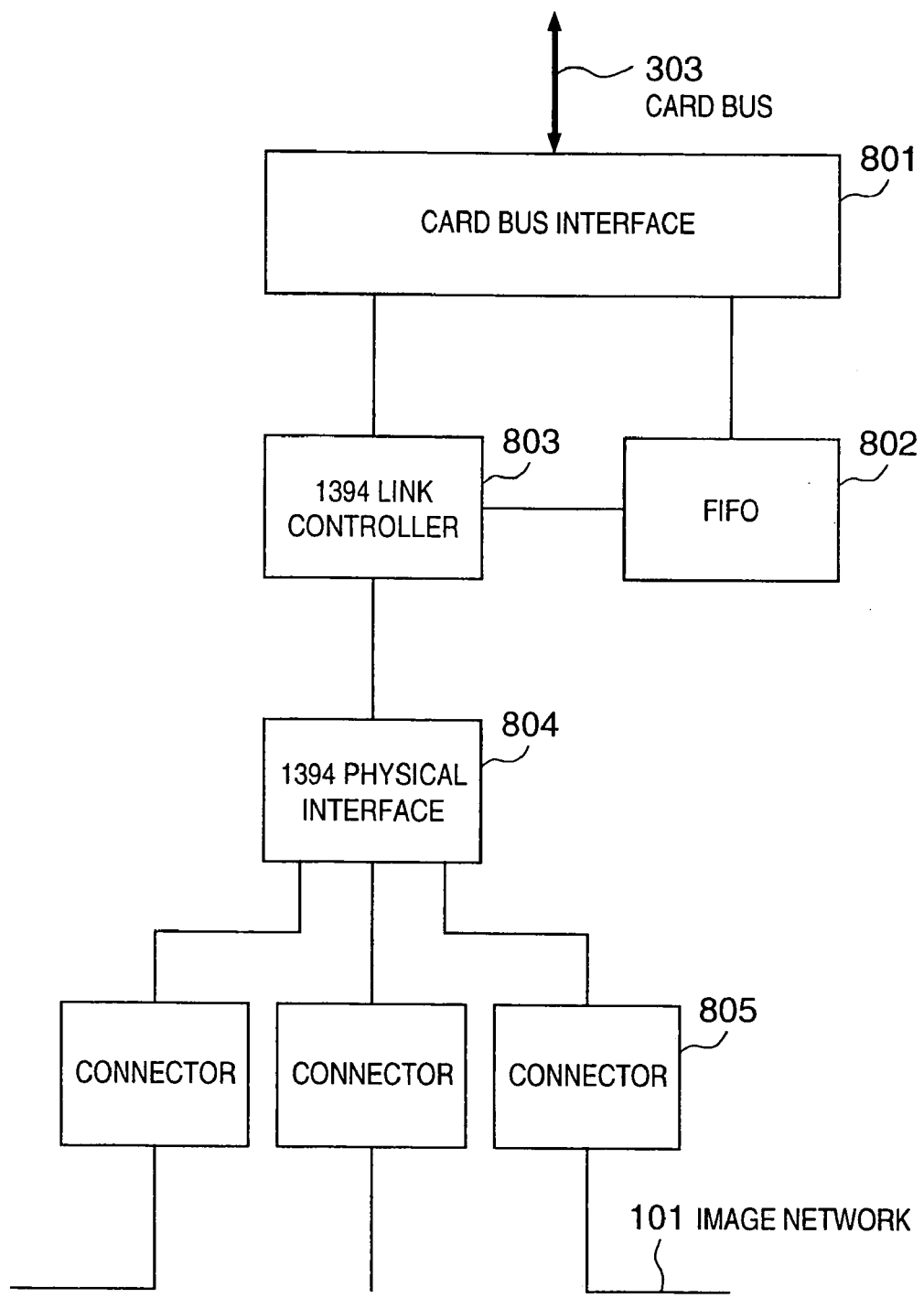
FIG. 6 is a block diagram showing the detailed construction of an image network interface card.

FIG. 6 is a block diagram showing the detailed construction of the image network interface card 309. Reference numeral 801 denotes a card bus interface; 802, a first-in first-out memory (to be referred to as a FIFO) for transferring image data; 803, a link controller chip (to be referred to as a 1394 link controller) for the 1394 serial bus serving as a high-speed serial interface adopted in the first embodiment; 804, a physical interface (to be referred to as a 1394 physical interface) for the 1394 serial bus; and 805, connectors to which interface cables of the image network 101 are connected. The connectors 805 allow connecting three cables in maximum to one 1394 physical interface 804.

The CPU 301 of the controller 102 transfers data in the procedure from a to f via the image network interface card 309 in order to transfer bitmap data to the printer 105 designated by the PC 107. At the following steps a to f, data is transferred in the arrow direction, and the content of transfer data is given in ( ).

a. Controller 102→Printer 105
    (Data Transmission Request Command)
  b. Printer 105→Controller 102
    (Data Reception Acknowledgment Command)
  c. Controller 102→Printer 105
    (Print Data Start Command)
  d. Controller 102→Printer 105
    (Bitmap Data)
  e. Controller 102 Printer 105
    (Print Data End Command)
  f. Printer 105→Controller 102
    (Print Data Reception Acknowledgment Command)

As described above, the data transfer mode of the 1394 serial bus includes the asynchronous transfer mode where data is transferred to a predetermined transfer destination and the data receiving side sends back data reception acknowledgment, and the isochronous transfer mode where data is transferred to an unspecified transfer destination and the receiving side does not send back any acknowledgment. The first embodiment transfers commands in the asynchronous transfer mode and bitmap data as image data in the isochronous transfer mode.

In the image network interface card 309 shown in FIG. 6, command data is input to the 1394 link controller 803 via the card bus interface 801 and transferred as asynchronous data. On the other hand, bitmap data is temporarily written in the FIFO 802 via the card bus interface 801. The 1394 link controller 803 reads out and transfers the bitmap data from the FIFO 802 in order to transfer the bitmap data in the isochronous transfer mode.

Figure 7:
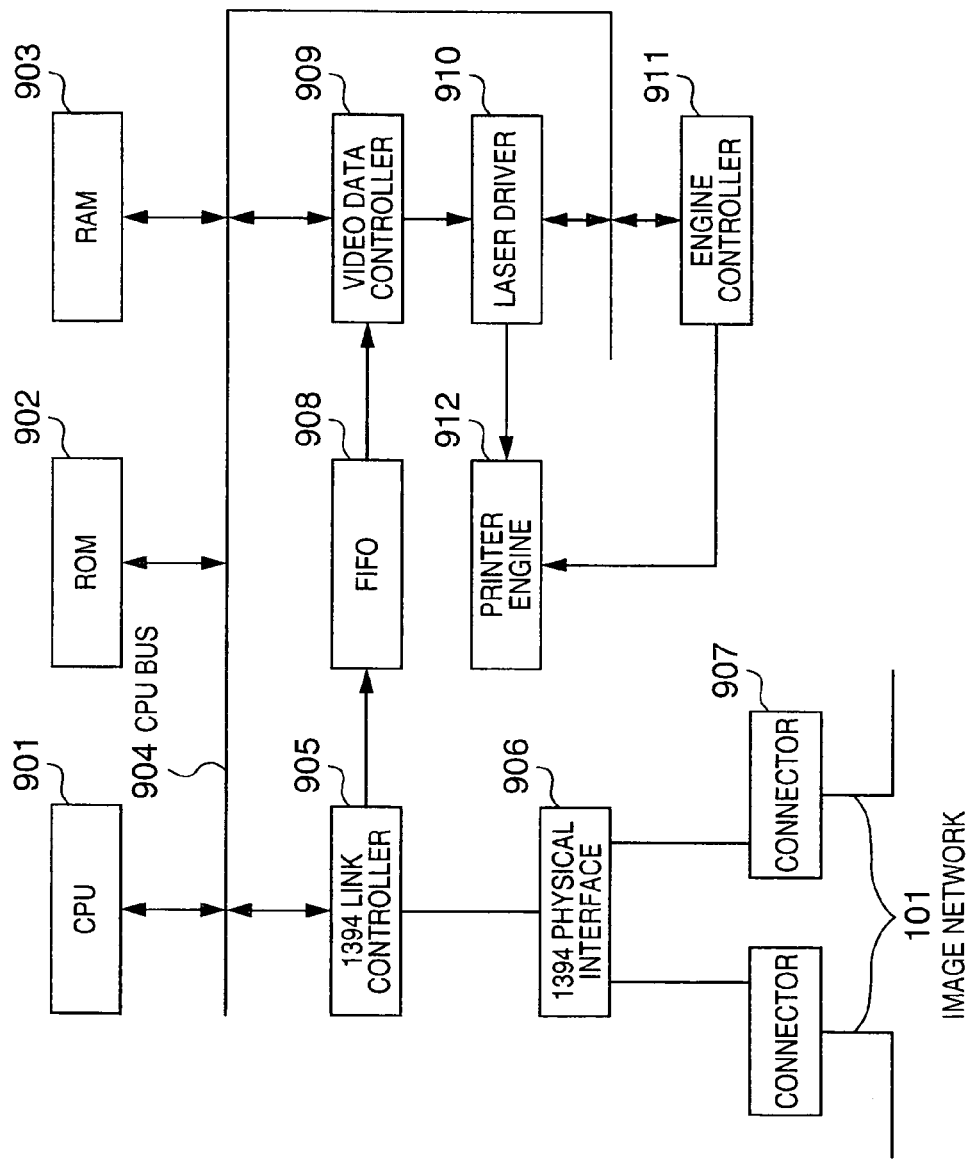
FIG. 7 is a block diagram showing the detailed construction of a printer.

The construction of the printer 105 will be explained. FIG. 7 is a block diagram showing the detailed construction of the printer 105. Reference numeral 901 denotes a CPU for performing all controls in the printer 105 such as mechatronics control and reception of bitmap data; 902, a ROM storing control programs of the CPU 901; 903, a RAM used as a work area of the CPU 901; 904, a CPU address bus & data bus for the CPU 901; 905, a 1394 link controller for controlling an interface with the image network 101 formed from the 1394 serial bus; 906, a 1394 physical interface; 907, a connector; 908, a FIFO for temporarily storing isochronously transferred bitmap data; 909, a video data controller for controlling a read of bitmap data from the FIFO 908 in accordance with the operation timing of a printer engine; 910, a laser driver for performing an actual print operation; 911, an engine controller for performing mechatronics control such as motor control of the printer engine or paper feed control; and 912, a printer engine.

Transfer of commands and data between the CPUs and link controllers of the controller 102 and printer 105 will be explained with reference to the transition chart of data transfer shown in FIG. 8. In FIG. 8, each of arrows #1001 to #1013 indicates one transfer. Respective transfers will be exemplified below.

1001: A data transmission request command is transferred from the controller 102 to a desired printer (printer 105 in this case) in the asynchronous transfer mode.

1002: The printer 105 receives the data transferred in the asynchronous transfer mode and sends the acknowledgment (to be referred to as ACK) from the 1394 link controller 905 of the printer 105 to the link controller 803 of the controller 102.

1003: The CPU 901 of the printer 105 receives a data transmission request command.

1004: The CPU 901 confirms the current status of the printer 105, and if a printout operation is possible, sends a data transmission request permission command to the link controller 803 of the controller 102. The data transmission request permission command is transferred in the asynchronous transfer mode by the 1394 link controller 905.

1005: The controller 102 sends the ACK of the data transmission request permission command from the 1394 link controller 803.

1006: The CPU 301 of the controller 102 receives the data transmission request permission command.

1007: Image data is transferred in the isochronous transfer mode from the controller 102 to the printer 105. Note that this image data transfer will be described in detail later.

1008: The controller 102 transfers a print data end command to the printer 105 upon completion of image data transfer.

1009: The 1394 link controller 905 of the printer 105 sends back the ACK of the print data end command to the link controller 803 of the controller 102.

1010: The CPU 901 of the printer 105 receives the print data end command.

1011: The printer 105 sends a print data reception acknowledgment command to the controller 102.

1012: The link controller 803 of the controller 102 sends back the ACK of the print data reception acknowledgment command to the 1394 link controller 803 of the printer 105.

1013: The CPU 301 of the controller 102 receives the print data reception acknowledgment command.

As described above, commands and image data are respectively transferred in the asynchronous and isochronous transfer modes between the controller 102 and printer 105 of the first embodiment.

<<Isochronous Transfer of Image Data>>

Isochronous transfer of image data in the first embodiment will be explained in detail.

In isochronous transfer, as described above, packets are transferred every 125 μs, and channels are ensured in advance to assure the data transfer time. Therefore, the controller 102 must confirm the processing speed (performance) of a printer (printer 105 in the first embodiment) to which data is to be transferred, and ensure a channel corresponding to this performance. A channel ensuring operation in the controller 102 will be explained with reference to the flowchart of FIG. 9.

At step S1101, the controller 102 confirms the performance of the printer 105. For example, the controller 102 confirms the main scanning period (to be referred to as a 1H period) in the printer 105 and the number of pixels in the 1H period (number of 1H pixels). At step S1102, the controller 102 calculates a necessary channel width based on the confirmed printer performance. For example, when the 1H period is 375 (125×3) μs and the number of 1H pixels is 7,200, a data transfer time for 7,200/3=2,400 pixels must be assured for each pack at an interval of 125 μs. For example, if the printer 105 is a binary printer, a data transfer channel for 2,400 bits is ensured for each packet. After determining the necessary channel in this way, the controller 102 ensures the necessary transfer channel via the link controller 803 at step S1103.

After ensuring the necessary channel for the printer 105, the controller 102 generates transfer data in an actual transfer format at step S1104 such that start and end headers are added to 1-page or 1H image data.

Figures 10A, 10B:
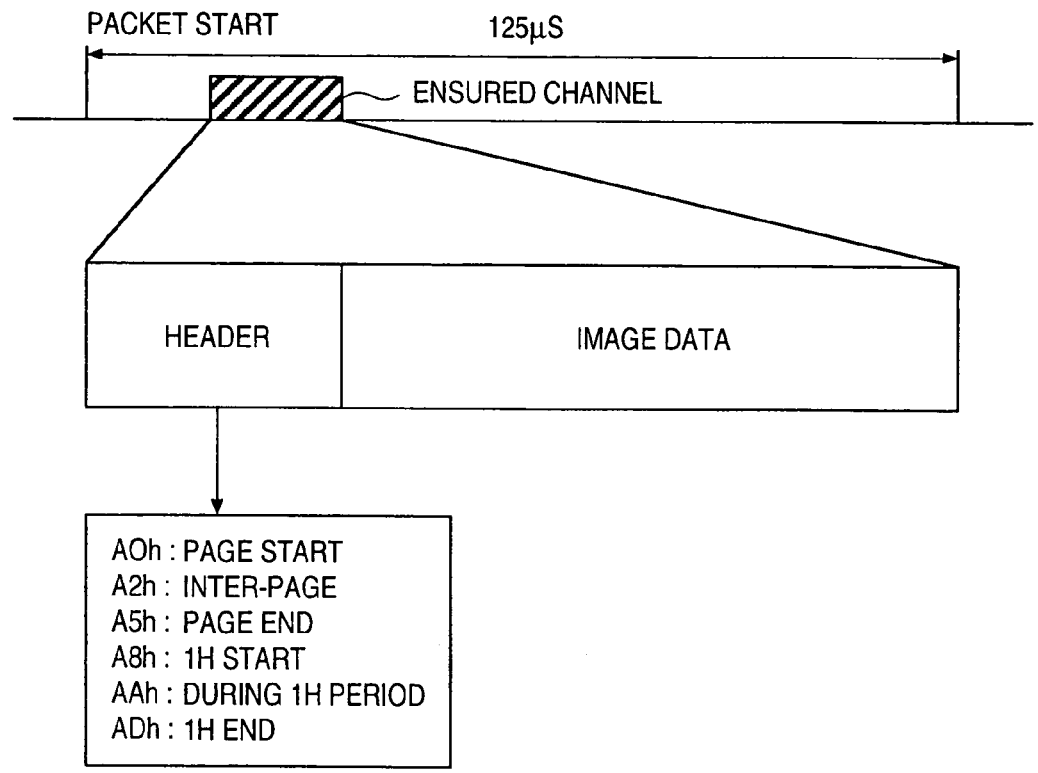
FIGS. 10A and 10B are views showing the construction of transfer data.

The generated transfer data will be explained with reference to a detailed example shown in FIGS. 10A and 10B. In FIG. 10A, one packet is formed every 125 μs, and the hatched portion in the packet represents an ensured channel. The hatched portion, i.e., ensured channel is made of a header and image data. The header includes a page start code, inter-page code, page end code, 1H start code, 1H period code, and 1H end code to allow the printer 105 side having received the transferred data to recognize the location at which position image data in the channel is located. For example, when data of 2,400 pixels out of 7,200 pixels as the number of 1H pixels is transferred by one channel of one packet, data of 7,200 pixels for 1H can be transferred by three packets, i.e., three channels.

FIG. 10B is a view showing a more detailed construction of the generated transfer data. When image data of n lines (n is a positive integer) is to be transferred, data from the first to 3 nth packets, i.e., data of 3n channels is transferred. As headers, the first packet has "A0h" indicating a page start code and "A8h" indicating a 1H start code in addition to image data, the second packet has "A2h" indicating an inter-page code and "AAh" indicating a 1H period code in addition to image data, the third packet has "A2h" indicating an inter-page code and "ADh" indicating a 1H end code in addition to image data, . . . By similarly adding headers, transfer data is generated and transferred. "A5h" indicating a page end code and "ADh" indicating a 1H end code are transferred by the 3 nth packet in addition to image data, thereby completing the transfer of 1-page image data.

Referring back to the flowchart in FIG. 9, if the controller 102 has completely generated transfer data, the generated transfer data is transferred to the FIFO 802 in the image network interface card 309 at step S1105. The FIFO 802 must have a size corresponding to a data size transferred by at least one packet. After storing the transfer data in the FIFO 802, the controller 102 causes the 1394 link controller 803 to execute data transfer at step S1106. While a header is added to image data to generate transfer data, as shown in FIG. 10, data transfer is repeatedly executed. If 1-page data has completely been transferred, the print data transfer is completed.

The printer 105 prints out the print data transferred in this manner. This printout will be explained with reference to the timing chart shown in FIG. 11. #1301 represents the period of a packet transferred from the controller 102, and the hatched portion represents image data in the isochronous transfer mode. #1302 represents the data write timing of the FIFO 908 in the printer, at which data transferred to the 1394 link controller 905 is written in the FIFO 908. #1303 represents the generation timing of a BD signal indicating the start of main scanning in the printer 105. In FIG. 11, one BD signal is generated every three packets. #1304 represents the read timing of the FIFO 908. As is apparent from #1304, 3-packet data is written in the FIFO 908 and then read out from it in synchronism with a next BD timing. #1305 represents a print operation, which is done during a read from the FIFO 908.

In this fashion, image data is transferred from the controller 102 to the selected printer 105 via the image network 101, and printed out.

<<Initialization of Network>>

A device connected to the network via the 1394 serial bus forms a topology map by the link controller upon energization to recognize all nodes connected to the network. At this time, all the nodes are assigned with node numbers in accordance with physical connection statuses and initial settings, and one root node is selected. In forming the topology map in the image network 101, the map must be initially set to necessarily select the controller 102 as a root node. Setting the controller 102 to the root node allows smooth subsequent management of the image network 101.

Figure 12:
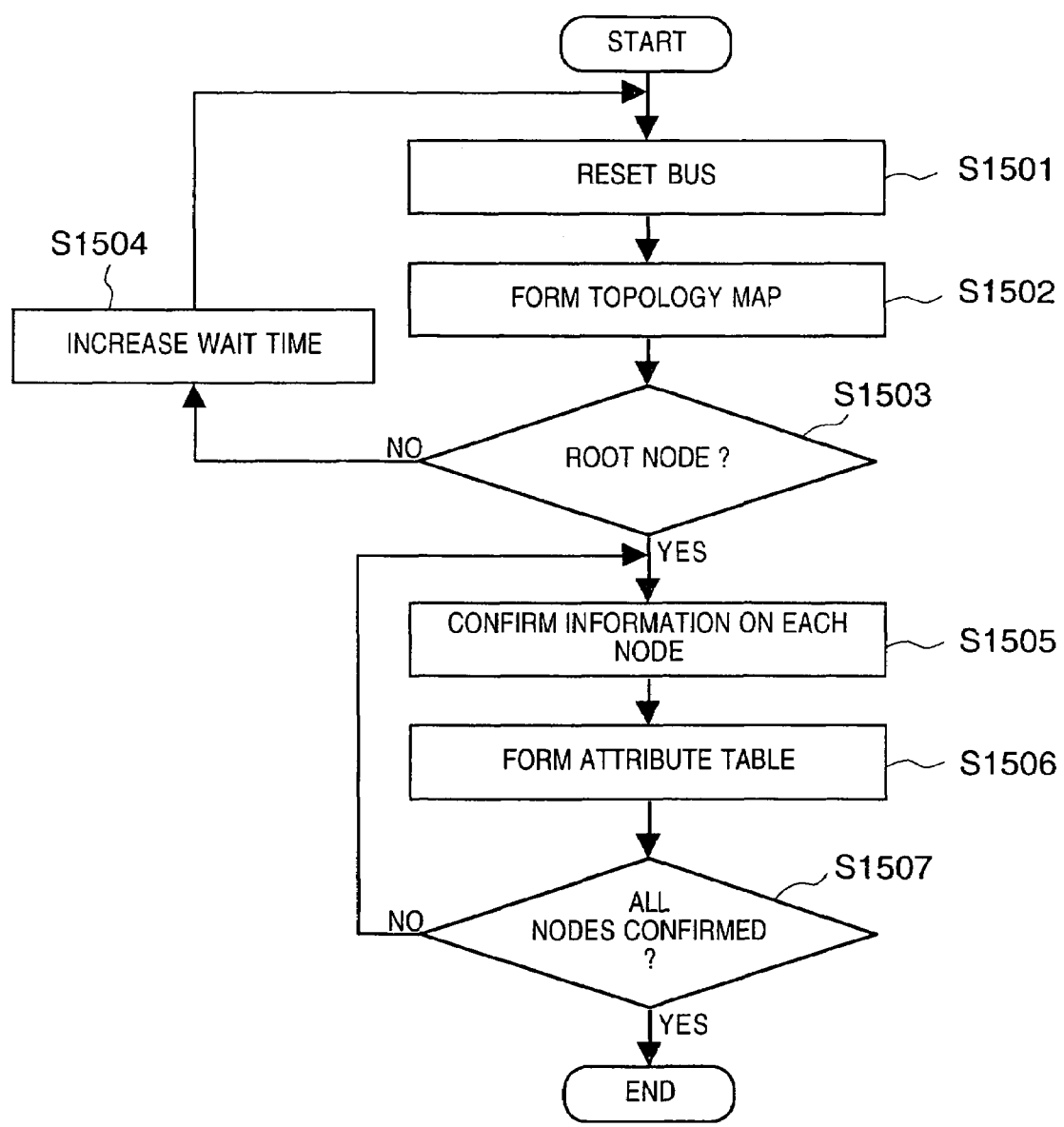
FIG. 12 is a flowchart showing initialization processing for a 1394 serial bus in the controller.

Initialization control of the image network 101 by the controller 102 set as a root node after a bus reset will be explained with reference to the flowchart of FIG. 12.

At step S1501, a bus reset signal for the 1394 serial bus, i.e., image network 101 is generated, and all 1394 physical interfaces connected to the image network 101 detect the bus reset signal and execute a reset cancel sequence. At step S1502, each node in the image network 101 performs predetermined control for a port connected after a predetermined wait time, while waiting for assignment of the node number and forming a topology map. If the 1394 link controller 905 of the controller 102 is determined at step S1503 not to be a root map, the wait time is increased by a predetermined time at step S1504. The flow returns to step S1501 to execute the bus reset sequence again and form a topology map again. In general, a wait time much longer than the wait time in a bus reset for a printer, color copying machine, monochrome digital copying machine or scanner recognized by the controller 102 must be set in the 1394 link controller 905 of the controller 102 in advance. Note that determination of whether or not the controller 102 is a root node at step S1503 must be repeatedly performed while increasing the wait time until the controller 102 is set to a root node, for the sake of subsequent management of the image network 101. As a matter of course, a predetermined upper limit must be set to the wait time.

If the controller 102 is set as a root node, the controller 102 inquires attribute information of each node in the image network 101 at step S1505. At step S1506, the controller 102 forms a node attribute table based on the attribute information sent from each node. This node attribute table allows the controller 102 to determine whether or not image data can be exchanged with each node, and if data transfer is possible, grasp the performance of the node. For example, when a given node is a printer, information on the presence/absence of a page memory, the resolution, the 1H period, the number of 1H pixels, and the print count is held in the node attribute table. If the controller 102 has confirmed attribute information of all nodes at step S1507, formation of the attribute table is completed.

Since the attributes of all devices in the image network 101 are grasped as a node attribute table after formation of the topology map in the controller 102, the command transfer overhead in data transfer can be reduced.

The node attribute table formed at step S1506 will be explained with reference to its structure shown in FIG. 29 and detailed example shown in FIG. 30.

As described above, the node attribute table is formed to manage devices connected to the image network 101 in the controller 102. The table includes items shown in FIG. 29. The item name of the node attribute table is given in " ". The "node number" is assigned to each node in forming the topology map. The "transfer rate" is one which is supported by the physical interface of the 1394 serial bus and is any one of 400 Mbps, 200 Mbps, and 100 Mbps. The "device type" represents whether a node is a device which transmits/receives image data to/from the controller 102, or a device which does not transmit/receive any image data. As the device type, a scanner, printer, copier or the like is set. The "image data input/output" represents the input/output characteristics of image data at the node, and is set as any one of input, output and input & output. In other words, if the node is a scanner, the "image data input/output" is set as "output".

Further, the node attribute table holds the scanner and printer attributes of each node. The scanner attribute means the characteristic of a scanner function (image input function) of the node, and the printer attribute means the characteristic of a printer function (image output function) of the node. As the scanner attribute, the "scanner data type" is set as color/monochrome, and the "scanner resolution (dpi)" and "scanner bit depth (bit/pixel)" are set. As the printer attribute, the "printer data type" is set as color/monochrome, and the "print speed (ppm)", "printer resolution (dpi)" and "printer bit depth (bit/pixel)" are set.

FIG. 30 shows a setting example of the node attribute table of the color copying machine 103, printers 104 and 105 and monochrome digital copying machine 106 in the image network 101. Since the copying machine has both the scanner and printer functions, it is set to "input/output" in the "image data input/output" item and managed as an image data transmission/reception device by the controller 102.

Note that device information managed by the node attribute table is not limited to the items shown in FIG. 29. For example, the "power supply ability" item is added to allow the controller 102 to grasp whether or not a certain node can supply and receive power via the 1394 serial bus cable. Needless to say, another device information can also be set.

<<Preferential Node Setting>>

As a feature of the first embodiment, priority is given to a predetermined node in the network by ensuring a channel for the isochronous transfer mode on the 1394 serial bus. The following description is directed to an example where a job to the color copying machine 103 (to be referred to as the copier 103 hereinafter) is preferentially processed in the image network 101.

Note that which of nodes is given priority is managed by the controller 102 in the first embodiment. This setting is performed arbitrarily by a console (not shown) of the controller 102 or by a predetermined command from any one of the PCs 107 to 112 via the network 100. In either case, a preferential node should be set by only a specific user, which requires security management to a certain degree such that a predetermined password is set.

Figure 31:
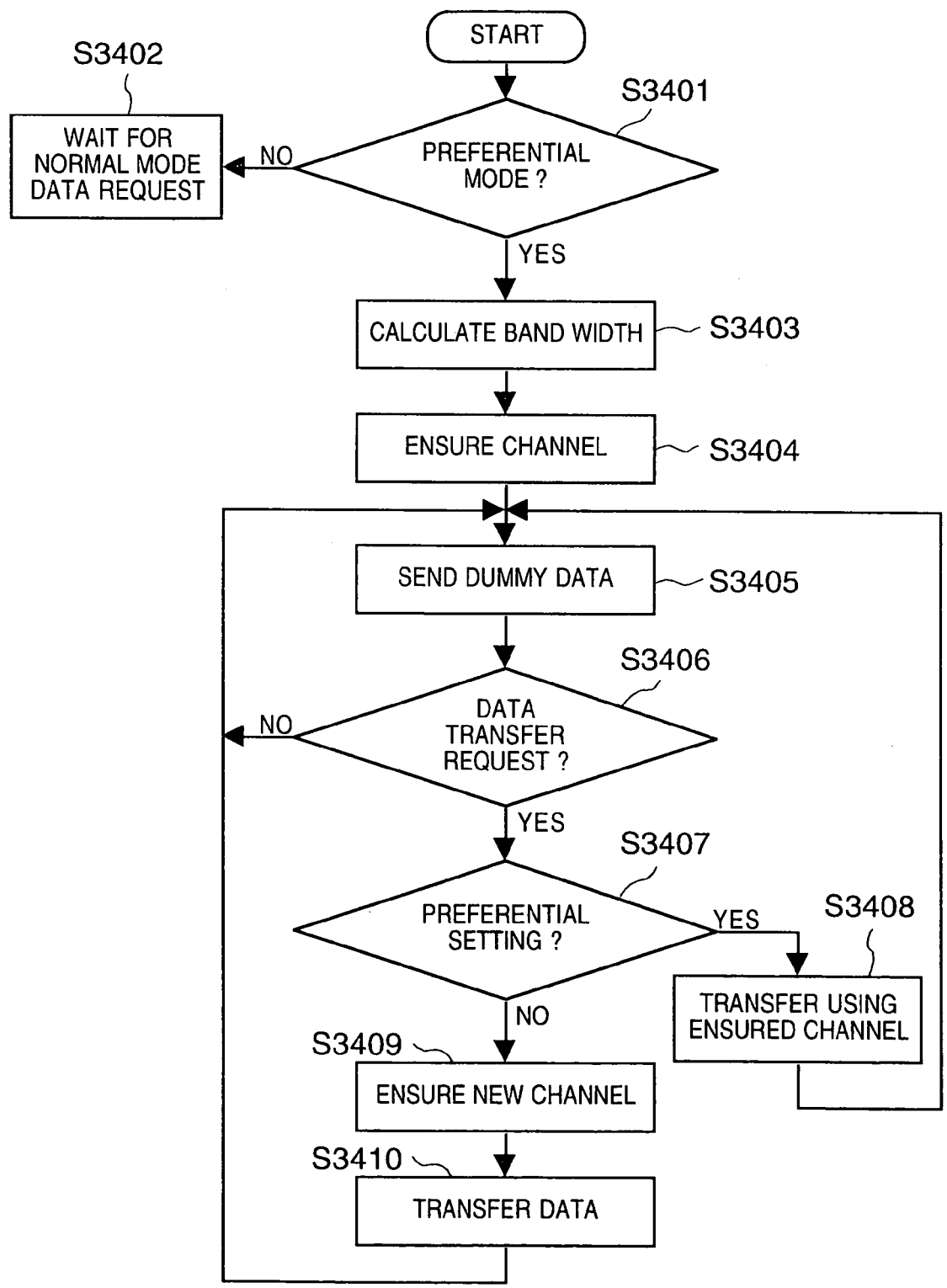
FIG. 31 is a flowchart showing data transfer processing in a preferential data transfer mode.

FIG. 31 is a flowchart showing operation of a "preferential mode" where data is preferentially transferred to the copier 103 in the controller 102. The processing shown in FIG. 31 is controlled by the controller 102.

At step S3401, the controller 102 checks whether or not the preferential mode is set. If YES at step S3401, the controller 102 advances to step S3403. Note that the preferential mode can be set by the controller 102 similarly to the aforementioned preferential node setting or by the PCs 107 to 112 via the network 100. If NO at step S3401, the controller 102 shifts to step S3402 to perform control in a normal mode where no preferential data transfer is done.

At step S3403, the controller 102 calculates a necessary band width in advance on the basis of the processing speed of the preferentially set copier 103. For example, when 7,200 pixels and 8 bits/pixel are set for a 1H period of 375 µs, at least 2,400-byte data must be transferred within one cycle of 125 µs. In this case, a time of 48 µs must be ensured every cycle even with an image data transfer rate of, e.g., 400 Mbps.

The controller 102 proceeds to step S3404 to ensure an isochronous channel on the 1394 serial bus. At this step, the controller 102 ensures a channel in consideration of data transfer regardless of the presence/absence of data to be transferred. The controller 102 advances to step S3405 to transfer dummy isochronous data to the ensured channel. Since no partner node is notified of data reception by asynchronous transfer in advance, any node does not receive this dummy isochronous data. The controller 102 confirms a data transfer request at step S3406, and if YES at step S3406, proceeds to step S3407. If NO at step S3406, the controller 102 returns to step S3405 to send dummy data again in a predetermined cycle and wait for a data transfer request.

If a destination of the data transfer request is preferentially set at step S3407, the controller 102 shifts to step S3408. If NO at step S3407, the controller 102 shifts to step S3409. At step S3408, the controller 102 transfers data using the isochronous channel ensured in advance because of the data transfer request to the preferentially set copier 103.

Upon completion of data transfer, the controller 102 returns to step S3405 to send dummy data and wait for a next data transfer request. When data is transferred to a node not preferentially set, the controller 102 newly ensures an isochronous channel corresponding to this data transfer at step S3409. At step S3410, the controller 102 transfers data by the newly ensured isochronous channel. The controller 102 similarly returns to step S3405 to send dummy data and wait for a data transfer request.

Note that the first embodiment has exemplified the case where the copier 103 in the image network 101 is a preferentially set node (to be referred to as a preferential node hereinafter). For example, any one of the PCs 107 to 112 connected to the network 100 as an Ethernet may be set as a preferential node for the controller 102. In this case, since a necessary band width depends on setting from the PC as a preferential node, the controller 102 may fail to receive a data transfer request other than the preferential node unless an excessively large band width is inhibited from being preferentially set. Therefore, a band width ensured for the preferential node must be limited.

As described above, according to the first embodiment, a predetermined node in the image network is preferentially set, a band width necessary for the node is ensured in advance, and only when a transfer request to this node is generated, data is transferred using the channel. As a result, data can be smoothly transferred to the preferentially set node.

Modification of First Embodiment

In the first embodiment, one preferential node is set in the image network 101 using the 1394 serial bus. However, since dummy data is continuously transferred until a transfer request to the preferential node is generated, the network is wastefully used while no transfer request to the preferential node is generated. For this reason, in actual operation of the image network 101, it is desirable for efficient network use to set a plurality of nodes as preferential nodes because transfer requests to the preferential nodes are frequently generated to decrease the dummy data transfer frequency.

In the first embodiment, when a data transfer request to a node other than the preferential node is generated, a new channel is ensured without using a channel ensured for the preferential node. In the present invention, however, an isochronous channel ensured for the preferential node may be used in accordance with the data amount of the data transfer request. For example, when a band width corresponding to the transfer request is equal to or less than half a band width ensured for the preferential node in advance, the transfer request may be permitted to use the channel ensured for the preferential node. Also, when the band width of the transfer request exceeds half the band width for the preferential node but the number of cycles required to complete data transfer is small, the transfer request may be permitted to use the channel for the preferential node. In this way, the channel for the preferential node can be appropriately used even in data transfer to a node other than the preferential node.

The use of the ensured channel is permitted in consideration of not only the size of a necessary band width at a node other than the preferential node, as described above, but also the utilization factor of the preferential node. For example, the number of successive dummy data transmission operations is counted, and if the count exceeds a predetermined value, the utilization factor of the preferential node is determined to be low, decreasing the ensured band width or cancelling the preferential setting. Alternatively, while the utilization factor of the preferential node is always calculated, the band width of the ensured channel may be dynamically changed in accordance with the value.

When the utilization factor of the preferential node is low, the preferential setting is canceled; when even a node other than the preferential node has a high utilization factor, this node is newly set as a preferential node. In this manner, it is also effective to dynamically switch preferential setting in accordance with the utilization factor of each node.

In the above-described embodiment, the image network 101 is constructed using a serial interface defined by the IEEE 1394 standard. However, the present invention is not limited to this and can be applied to a network constructed using an arbitrary serial interface such as one called a universal serial bus (USB).

OTHER EMBODIMENT

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiment/embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the foregoing embodiment.

As has been described above, according to the present invention, since an isochronous channel for a specific device in a network using the 1394 serial bus is ensured and maintained in the network using the 1394 serial bus, it is possible to preferentially process a job related to this device. In other words, the device can be permitted to preferentially use the network.

By virtue of the above, the network can be efficiently used. Accordingly, it is possible to provide a data transfer apparatus and method as well as a data transfer system for avoiding a decrease in network throughput caused by transfer of a large amount of data.

As many apparently widely different embodiments of the present invention can be made without departing from the spirit and scope thereof, it is to be understood that the invention is not limited to the specific embodiments thereof except as defined in the appended claims.

What is claimed is:

1. A data transfer apparatus for transferring data to a device, comprising:
   band width calculation means for calculating a band width based on a performance of a predetermined device among a plurality of devices;
   first channel ensuring means for ensuring a channel having the band width calculated by the band width calculation means;
   transfer means for transferring data to the predetermined device using the channel ensured by the first channel ensuring means, if a destination of a data transfer is set to the predetermined device; and
   second channel ensuring means for ensuring a channel corresponding to the data transfer, if the destination of the data transfer is not set to the predetermined device.

2. The apparatus according to claim 1, wherein the predetermined device is a device set as a preferential device.

3. The apparatus according to claim 2, wherein the band width calculation means calculates a band width necessary for a data transfer with a printer based on a processing speed of the printer.

4. The apparatus according to claim 3, wherein the processing speed of the printer is based on at least one of a print speed, a print resolution, and a printer bit depth.

5. The apparatus according to claim 3, wherein the processing speed of the printer is based on at least one of a main scanning period in printing, a number of pixels formed in the main scanning period, and a number of bits representing one pixel.

6. The apparatus according to claim 2, further comprising device setting means for setting at least one of a plurality of devices as the preferential device.

7. The apparatus according to claim 6, further comprising determination means for determining whether a destination of a data transfer is the predetermined device.

8. The apparatus according to claim 6, further comprising monitoring means for monitoring a usage of the predetermined device by the channel ensured by the first channel ensuring means, wherein the device setting means sets the preferential device again in accordance with the usage of the device.

9. The apparatus according to claim 6, further comprising monitoring means for monitoring usages of the plurality of devices, wherein the device setting means resets the preferential device in accordance with the usages of the plurality of devices.

10. The apparatus according to claim 1, further comprising:
    determination means for determining whether a destination of data transfer is the predetermined device; and
    second transfer means for performing data transfer to another device other than the predetermined device using the channel ensured by the second channel ensuring means, if the destination of the data transfer is not the predetermined device.

11. The apparatus according to claim 1, wherein the transfer means performs an isochronous transfer.

12. The apparatus according to claim 11, wherein, when no request for the data transfer to the predetermined device is performed, the transfer means sends invalid data using the channel ensured by the first channel ensuring means.

13. The apparatus according to claim 11, further comprising control means for, when a band width necessary for a data transfer with another device other than the predetermined device is not more than a predetermined value, controlling to perform a data transfer with the other device using the channel ensured by the first channel ensuring means.

14. The apparatus according to claim 13, wherein the predetermined value is half a band width calculated by the band width calculation means.

15. The apparatus according to claim 11, further comprising control means for, when a number of cycles necessary for a data transfer with another device other than the predetermined device is not more than a predetermined value, controlling to perform a data transfer with the other device using the channel ensured by the first channel ensuring means.

16. The apparatus according to claim 1, further comprising monitoring means for monitoring a usage of the predetermined device by the channel ensured by the first channel ensuring means, wherein the first channel ensuring means ensures the channel again in accordance with the usage of the device.

17. The apparatus according to claim 1, wherein the channel ensuring means ensures the channel when the band width is not more than a predetermined value.

18. The apparatus according to claim 1, wherein the predetermined device is connected to a serial bus complying with an IEEE 1394 standard.

19. The apparatus according to claim 1, wherein the predetermined device is connected to a serial bus complying with a USB standard.

20. A data transfer method for transferring data to a device, comprising:
 a band width calculation step, of calculating a band width based on a performance of a predetermined device among a plurality of devices;
 a first channel ensuring step, of ensuring a channel having the band width calculated in the band width calculation step;
 a transfer step, of transferring data to the predetermined device using the channel ensured in the first channel ensuring step, if a destination of a data transfer is set to the predetermined device; and
 a second channel ensuring step, of ensuring a channel corresponding to the data transfer if the destination of the data transfer is not set to the predetermined device.

21. The method according to claim 20, wherein the predetermined device is a device set as a preferential device.

22. The method according to claim 21, wherein the band width calculation step comprises calculating a band width necessary for a data transfer with a printer based on a processing speed of the printer.

23. The method according to claim 22, wherein the processing speed of the printer is based on at least one of a print speed, a print resolution, and a printer bit depth.

24. The method according to claim 22, wherein the processing speed of the printer is based on at least one of a main scanning period in printing, a number of pixels formed in the main scanning period, and a number of bits representing one pixel.

25. The method according to claim 21, further comprising a device setting step, of setting at least one of a plurality of devices as the preferential device.

26. The method according to claim 25, further comprising a determination step, of determining whether a destination of a data transfer is the predetermined device.

27. The method according to claim 25, further comprising:
 a monitoring step, of monitoring a usage of the predetermined device by the channel ensured in the first channel ensuring step; and
 a device resetting step, of resetting the predetermined device in accordance with the usage of the predetermined device.

28. The method according to claim 25, further comprising:
 a monitoring step, of monitoring usages of the plurality of devices; and
 a device resetting step, of resetting the predetermined device in accordance with the usages of the plurality of devices.

29. The method according to claim 20, further comprising:
 a determination step, of determining whether a destination of a data transfer is the predetermined device; and
 a second transfer step, of performing a data transfer to another device other than the predetermined device using the second channel ensured in the second channel ensuring step, if the destination of the data transfer is not the predetermined device.

30. The method according to claim 20, wherein the transfer step comprises performing an isochronous transfer.

31. The method according to claim 30, wherein, when a band width necessary for a data transfer with another device other than the predetermined device is not more than a predetermined value, the transfer step comprises controlling to perform a data transfer with the other device using the channel ensured in the first channel ensuring step.

32. The method according to claim 31, wherein the predetermined value is half a band width calculated in the band width calculation step.

33. The method according to claim 30, wherein, when no request for the data transfer to the predetermined device is performed, the transfer step comprises sending invalid data using the channel ensured in the first channel ensuring step.

34. The method according to claim 30, wherein, when a number of cycles necessary for a data transfer with another device other than the predetermined device is not more than a predetermined value, the transfer step comprises controlling to perform a data transfer with the other device using the channel ensured in the first channel ensuring step.

35. The method according to claim 20, further comprising:
 a monitoring step, of monitoring a usage of the predetermined device by the channel ensured in the first channel ensuring step; and
 a channel re-ensuring step of ensuring the channel ensured in the first channel ensuring step again in accordance with the usage of the predetermined device.

36. The method according to claim 20, wherein the channel ensuring step comprises ensuring the channel when the band width is not more than a predetermined value.

37. The method according to claim 20, wherein the predetermined device is connected to a serial bus complying with an IEEE 1394 standard.

38. The method according to claim 20, wherein the predetermined device is connected to a serial bus complying with a USB standard.

39. A data transfer system for transferring data with a device, comprising:

band width calculation means for calculating a band width based on a performance of a predetermined device among a plurality of devices;

first channel ensuring means for ensuring a channel having the band width calculated by the band width calculation means;

transfer means for transferring data to the predetermined device using the channel ensured by the first channel ensuring means, if a destination of a data transfer is set to the predetermined device; and second channel ensuring means for ensuring a channel corresponding to the data transfer, if the destination of the data transfer is not set to the predetermined device.

40. A data transfer apparatus for transferring data to a device, comprising:

channel ensuring means for ensuring a channel for operation based on a preferential mode; and transfer means for transferring data to the device using the channel ensured by the channel ensuring means, if the data is to be transferred to the device in the preferential mode.

41. The apparatus according to claim 40, wherein, in the preferential mode, the transfer means transfers the data to a device set as a preferential device.

42. The apparatus according to claim 40, further comprising dummy data transfer means for, in the preferential mode, transferring dummy data using the channel ensured by the channel ensuring means, without a data transfer request.

43. A data transfer apparatus for transferring data to a device, comprising:

first channel ensuring means for ensuring a channel for a predetermined device among a plurality of devices;

transfer means for transferring data to the predetermined device using the channel ensured by the first channel ensuring means, if a destination of a data transfer is set to the predetermined device; and second channel ensuring means for ensuring a channel corresponding to the data transfer, if the destination of the data transfer is not set to the predetermined device.

44. The apparatus according to claim 43, further comprising device setting means for setting at least one of a plurality of devices as a preferential device.

45. The apparatus according to claim 43, further comprising dummy data transfer means for transferring dummy data using the channel ensured by the first channel ensuring means, without a data transfer request.

* * * * *

UNITED STATES PATENT AND TRADEMARK OFFICE
CERTIFICATE OF CORRECTION

| | | |
|---|---|---|
| PATENT NO. | : 7,050,184 B1 | |
| APPLICATION NO. | : 09/299875 | |
| DATED | : May 23, 2006 | |
| INVENTOR(S) | : Ryosuke Miyamoto | |

It is certified that error appears in the above-identified patent and that said Letters Patent is hereby corrected as shown below:

<u>IN THE DRAWINGS</u>:
Sheet 9, FIG. 9, "CONTROI" should read --CONTROL--.

<u>COLUMN 1</u>:
Line 50, "involving" should read --involved--.

<u>COLUMN 5</u>:
Line 7, "an" should read --a--.

<u>COLUMN 7</u>:
Line 3, "waited" should read --made to wait--.
Line 35, "notifies" should read --notifying--.
Line 37, "been" should be deleted.
Line 52, "similar" should read --similarly--.
Line 60, "been" should be deleted.

<u>COLUMN 8</u>:
Line 63, "is" should read --does--.

<u>COLUMN 10</u>:
Line 29, "an" should read --a--.

<u>COLUMN 11</u>:
Line 7, "an" should be deleted.

<u>COLUMN 14</u>:
Line 64, "102 Printer" should read --102→ Printer--.

<u>COLUMN 17</u>:
Line 23, "1 -page" should read --1-page--.

UNITED STATES PATENT AND TRADEMARK OFFICE
CERTIFICATE OF CORRECTION

PATENT NO. : 7,050,184 B1
APPLICATION NO. : 09/299875
DATED : May 23, 2006
INVENTOR(S) : Ryosuke Miyamoto It is certified that error appears in the above-identified patent and that said Letters Patent is hereby corrected as shown below:

COLUMN 21:
Line 39, "are" should read --being--.

COLUMN 22:
Line 17, "data" should read --the data--.
Line 22, "transfer," should read --transfer in accordance with a data transfer request for transferring the data to another device,--.
Line 23, "device." should read --device, ¶ wherein the first channel ensuring means ensures the channel before each of a data transfer request for transferring the data to the predetermined device and a data transfer request for transferring the data to the other device is issued.--.

COLUMN 23:
Line 27, "channel" (first occurrence) should read --first channel--.
Line 43, "data" should read --the data--.
Line 48, "transfer" should read --transfer in accordance with a data transfer request for transferring the data to another device,--.
Line 49, "device." should read --device, ¶ wherein the first channel ensuring step ensures the channel before each of a data transfer request for transferring the data to the predetermined device and a data transfer request for transferring the data to the other device is issued.--.

COLUMN 24:
Line 58, "channel" (first occurrence) should read --first channel--.

COLUMN 25:
Line 7, "data" should read --the data--.
Line 12, "transfer," should read --transfer in accordance with a data transfer request for transferring the data to another device,--.
Line 13, "device." should read --device, ¶ wherein the first channel ensuring means ensures the channel before each of a data transfer request for transferring the data to the predetermined device and a data transfer request for transferring the data to the other device is issued.--.
Line 17, "mode;" should read --mode before a data transfer request for transferring the data in the preferential mode is issued;--.
Line 18, "data" should read --the data--.

UNITED STATES PATENT AND TRADEMARK OFFICE
CERTIFICATE OF CORRECTION

PATENT NO. : 7,050,184 B1
APPLICATION NO. : 09/299875
DATED : May 23, 2006
INVENTOR(S) : Ryosuke Miyamoto It is certified that error appears in the above-identified patent and that said Letters Patent is hereby corrected as shown below:

COLUMN 26:
Line 9, "data" should read --the data--.
Line 15, "transfer," should read --transfer in accordance with a data transfer request for transferring the data to another device,--.
Line 16, "device." should read --device, ¶ wherein the first channel ensuring means ensures the channel before each of a data transfer request for transferring the data to the predetermined device and a data transfer request for transferring the data to the other device is issued.--.

Signed and Sealed this

Seventh Day of April, 2009

JOHN DOLL
*Acting Director of the United States Patent and Trademark Office*